US010185547B2

(12) United States Patent
Sun et al.

(10) Patent No.: US 10,185,547 B2
(45) Date of Patent: Jan. 22, 2019

(54) TECHNIQUES FOR DISTRIBUTED OPERATION OF SECURE CONTROLLERS

(71) Applicant: INTEL CORPORATION, Santa Clara, CA (US)

(72) Inventors: Mingqiu Sun, Beaverton, OR (US); Rajesh Poornachandran, Portland, OR (US); Vincent J. Zimmer, Federal Way, WA (US); Ned M. Smith, Beaverton, OR (US); Gopinatth Selvaraje, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/751,519

(22) Filed: Jun. 26, 2015

(65) Prior Publication Data
US 2016/0378443 A1    Dec. 29, 2016

(51) Int. Cl.
*G06F 9/45* (2006.01)
*G06F 8/41* (2018.01)
(Continued)

(52) U.S. Cl.
CPC ............... *G06F 8/41* (2013.01); *G06F 9/455* (2013.01); *G06F 9/45516* (2013.01);
(Continued)

(58) Field of Classification Search
CPC .......... G06F 8/10–8/78; G06F 9/455–9/45558
See application file for complete search history.

(56) References Cited

U.S. PATENT DOCUMENTS

| | | | |
|---|---|---|---|
| 8,286,198 B2 * | 10/2012 | Munshi ................. | G06F 9/4843 717/119 |
| 9,032,379 B2 * | 5/2015 | Kalogeropulos ....... | G06F 8/443 717/152 |

(Continued)

OTHER PUBLICATIONS

Khondoker, Rahamatullah et al., "Feature-based Comparison and Selection of Software Defined Networking (SDN) Controllers," pp. 1-7. (Year: 2014).*

(Continued)

*Primary Examiner* — Benjamin C Wu
*Assistant Examiner* — Christopher J Franco

(57) ABSTRACT

Various embodiments are generally directed to techniques for supporting the distributed execution of a task routine among multiple secure controllers incorporated into multiple computing devices. An apparatus includes a first processor component and first secure controller of a first computing device, where the first secure controller includes: a selection component to select the first secure controller or a second secure controller of a second computing device to compile a task routine based on a comparison of required resources to compile the task routine and available resources of the first secure controller; and a compiling component to compile the task routine into a first version of compiled routine for execution within the first secure controller by the first processor component and a second version for execution within the second secure controller by a second processor component in response to selection of the first secure controller. Other embodiments are described and claimed.

25 Claims, 12 Drawing Sheets

(51) Int. Cl.
  *G06F 9/455* (2018.01)
  *G06F 21/00* (2013.01)
  *G06F 21/57* (2013.01)
(52) U.S. Cl.
  CPC ............. *G06F 21/00* (2013.01); *G06F 21/57* (2013.01); *G06F 9/45533* (2013.01)

(56) References Cited

U.S. PATENT DOCUMENTS

| | | | | |
|---|---|---|---|---|
| 9,117,071 | B2* | 8/2015 | Beretta | G06F 9/45516 |
| 9,235,388 | B2* | 1/2016 | Kannan | G06F 3/0482 |
| 9,400,685 | B1* | 7/2016 | Ge | G06F 9/4881 |
| 9,489,184 | B2* | 11/2016 | Goetz | G06F 8/47 |
| 2003/0140333 | A1* | 7/2003 | Odaka | G06F 8/71 |
| | | | | 717/115 |
| 2004/0148605 | A1* | 7/2004 | Kim | G06F 8/45 |
| | | | | 718/100 |
| 2004/0199907 | A1* | 10/2004 | Motokawa | G06F 8/4442 |
| | | | | 717/140 |
| 2009/0307699 | A1* | 12/2009 | Munshi | G06F 9/4843 |
| | | | | 718/102 |
| 2010/0313079 | A1* | 12/2010 | Beretta | G06F 9/5055 |
| | | | | 714/48 |
| 2010/0313189 | A1* | 12/2010 | Beretta | G06F 9/45516 |
| | | | | 717/148 |
| 2013/0007693 | A1* | 1/2013 | Bliss | G06F 8/63 |
| | | | | 717/101 |
| 2014/0380289 | A1* | 12/2014 | Kalogeropulos | G06F 8/443 |
| | | | | 717/152 |
| 2015/0227350 | A1* | 8/2015 | Kannan | G06F 3/0482 |
| | | | | 717/140 |
| 2015/0356292 | A1* | 12/2015 | Beretta | G06F 9/45516 |
| | | | | 726/22 |

OTHER PUBLICATIONS

Berlier, Jacob A. et al., "A Constraint Satisfaction Algorithm for Microcontroller Selection and Pin Assignment," pp. 348-351. (Year: 2010).*

Palmieri, Manuel et al., "Comparison of Cross-Platform Mobile Development Tools," pp. 179-186. (Year: 2012).*

Wen, Xiaolong et al., "Comparison of Open-Source Cloud Management Platforms: OpenStack and OpenNebula," pp. 2457-2461. (Year: 2012).*

Gallo, Roberto et al., "Short: Security and System Architecture: Comparison of Android Customizations," pp. 1-6. (Year: 2015).*

Chowdhary, Chiranji Lal et al., "Design and Implementation of Secure, Platform-free, and Network-based Remote Controlling and Monitoring System," p. 195-198. (Year: 2012).*

* cited by examiner

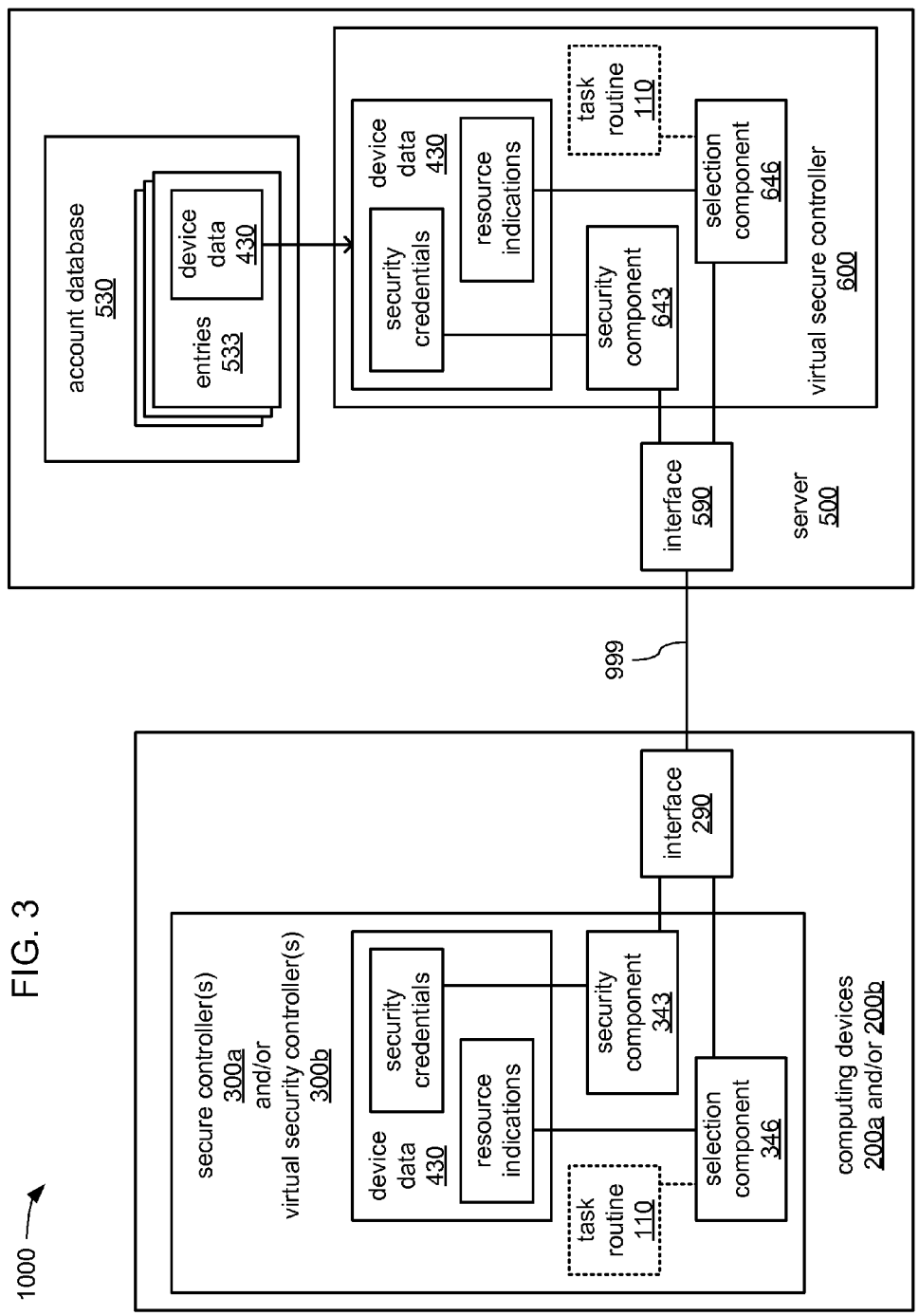

TECHNIQUES FOR DISTRIBUTED OPERATION OF SECURE CONTROLLERS

BACKGROUND

It is becoming increasingly commonplace to incorporate a trusted computing base (TCB) in computing devices to provide a trusted processing environment in which to execute a task routine. Many TCBs are implemented using a microcontroller or other form of relatively low power processor component and storage that are both separate and distinct from a main processor component and main storage that provide the main processing environment for executing an operating system and/or applications software. The trusted processing environment provided by a TCB is often largely isolated from the operating system and/or applications software to prevent tampering of task routines executed within the TCB by malicious software (e.g., so-called "viruses" or "worms") that may be executed within the main processing environment.

The task routines may perform various security functions, including and not limited to, access control, authentication, and integrity verification. The storage associate with a TCB is often used to store one or more forms of security credentials, such as digital signatures, encryption/decryption keys, hash values, seeds for pseudo-random number generators, white lists and/or black lists of persons and/or other computing devices, etc.

BRIEF DESCRIPTION OF THE DRAWINGS

FIG. 3 illustrates an example of exchanges of device data among secure controllers.

DETAILED DESCRIPTION

Figure 1:
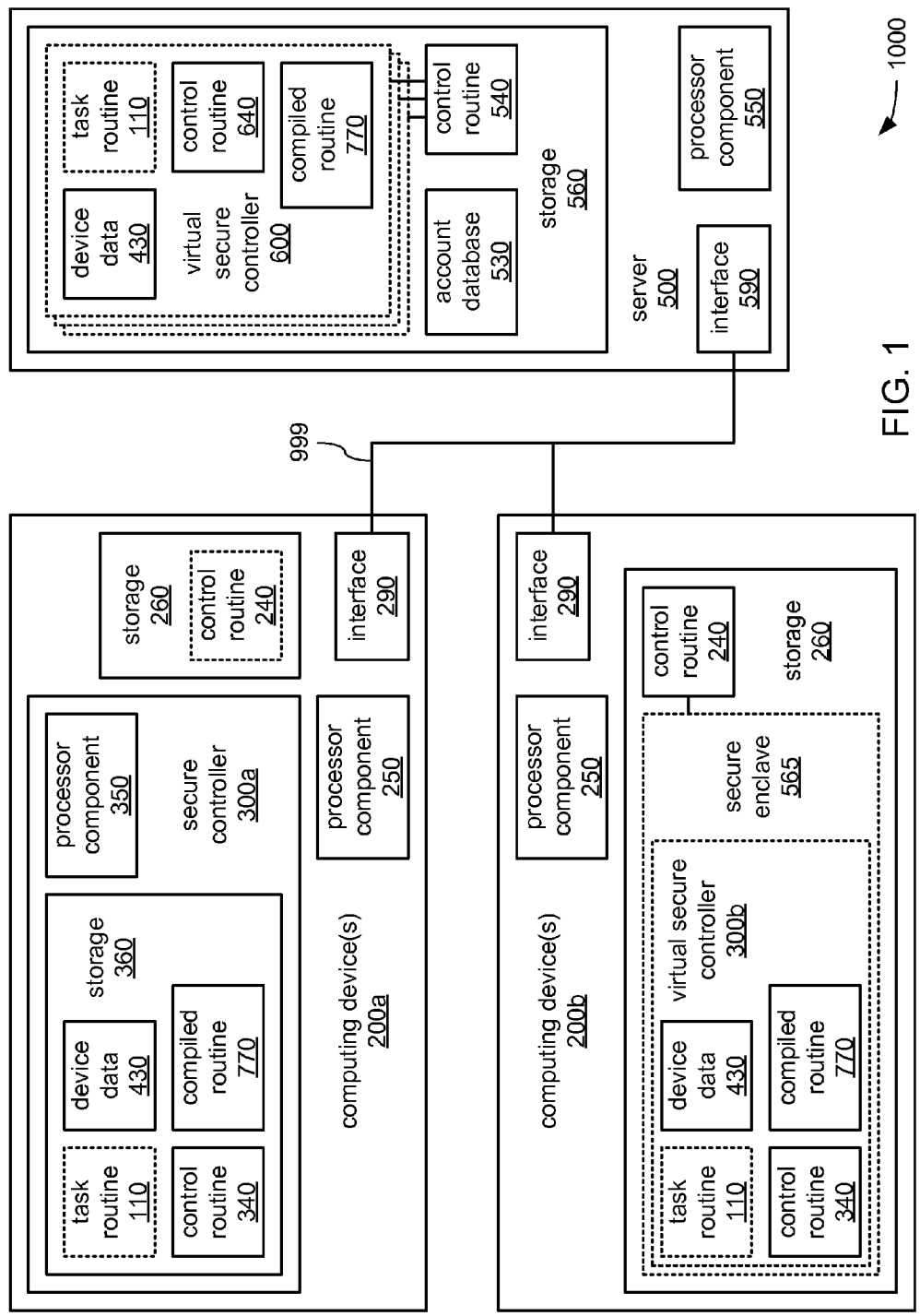
FIG. 1 illustrates an example embodiment of a secure processing system.

Various embodiments are generally directed to techniques for supporting the distributed execution of a task routine among multiple secure controllers incorporated into multiple computing devices. A secure controller of one of multiple computing devices may compile a task routine into multiple versions of a compiled routine, each version for execution by a different type of processor component that may be incorporated into one or more secure controllers of the multiple computing devices. The secure controller that compiles the task routine may then distribute the multiple versions of the compiled routine among the secure controllers of the other computing devices. The multiple secure controllers may then cooperate to determine which one(s) of the multiple secure controllers are to execute at least a portion of a corresponding version of the compiled routine to perform one or more of the functions of the task routine such that the functions of the task routine may be performed in a distributed manner. The task routine may be any of a variety of types of routine associated with enforcing a security policy to protect data and/or devices, including and not limited to authentication of a device or person, verification of data or executable instructions, encryption or decryption, compression or decompression, etc.

A secure processing system may be made up of multiple computing devices that each incorporate a secure controller, and those multiple secure controllers may be capable of communicating with each other through a network extending among those multiple computing devices. Each of the multiple computing devices may be incorporated into or may be any of a variety of types of device, including and not limited to, vehicles, portable computing devices, office machinery, medical devices, appliances, multimedia devices, entertainment devices, etc. The multiple secure controllers may be caused to engage in a pairing procedure or other procedure by which security credentials are exchanged thereamong to enable those secure controllers to subsequently recognize each other and to deem one another to be trusted for cooperating to perform the functions of a task routine. Alternatively or additionally, security credentials may be exchanged thereamong to enable data and/or routines to be exchanged in encrypted form. The network of such a secure processing system may be limited to extending within a single structure (e.g., a house or a place of business). However, as will be explained in greater detail, the network may be extended to reach and enable the inclusion of a remote server in which a virtual secure controller may be provided to serve as part of the secure processing system.

Different ones of the multiple secure controllers may be implemented in different ways within each of the multiple computing devices. By way of example, the secure controller of at least one of the computing devices may be implemented with a controller processor component and controller storage that are separate and distinct from a main processor component and main storage such that a task routine is executed by the controller processor component in physical isolation from an operating system and/or application routine(s) executed by the main processor component. Alternatively or additionally, the secure controller of at least one of the multiple computing devices may be implemented as a mode of operation of the main processor component by which the main processor component maintains a portion of the main storage as a secure enclave in which the main processor component executes a task routine in isolation from an operating system and/or application routine(s) that are also executed by the main processor component. As still another alternative, a server may instantiate a virtual machine (VM) in which a processor component of the server provides a virtual secure controller.

Also, different ones of the processor components that are incorporated into or are otherwise associated with the each of the secure controllers may be different types of processor component that employ different instructions sets and/or incorporate other unique features. By way of example, one of the secure controllers of one of the computing devices may be based on the IA-32 or IA-64 architecture promulgated by Intel Corporation of Santa Clara, Calif., USA, while another one of the secure controllers of another one of the computing devices may be based on the ARM architecture promulgated by ARM Holdings of Cambridge, England. As a result, each of these two processor components may employ an entirely different instruction set such that a compiled routine for execution by one of these two processor components would not be executable by the other. By way of another example, two of the secure controllers of two of the computing devices may each be based on a processor component belonging to the same family of processor components as the other such that those two processor components may employ instruction sets that are highly similar, but not exactly alike such that one or both may include unique features that the other does not (e.g., a unique extension to the instruction set). As a result, it may be possible to generate a compiled routine that may be executable by both of these two processor components. However, it may still be deemed desirable to generate a separate version of that compiled routine that makes use of the unique features of one or the other of those two processor components.

To enable compiling and distributed execution of a task routine, the multiple secure controllers may exchange information concerning the available processing, storage and/or other resources of each thereamong as part of cooperating to determine which of those multiple secure controllers is to compile the task routine. In some embodiments a virtual secure controller generated within a server may be among the secure controllers that exchange such information and cooperate to make such a determination. Indeed, in some embodiments, it may be a virtual secure controller that is selected to compile the task routine. If the secure controller (or the virtual secure controller) selected to compile the task routine is not already provided with the task routine, another of the multiple secure controllers may transmit a copy of the task routine to the selected one of the secure controllers via the network.

In compiling the task routine, the secure controller selected to so compile the task routine into multiple versions of a compiled routine. Different ones of the multiple versions of the compiled routine may be generated from the task routine to accommodate different types of processor components among the multiple secure controllers that employ different instruction sets such that those different processor components cannot execute the same version. Alternatively or additionally, different ones of the multiple versions of the compiled routine may be so generated to make use of unique features of one or more of different processor components despite it being possible to generate a single version of the compiled routine from the task routine that would be executable by those different processor components.

To enable such compiling, one or more of the secure controllers may be provided with a compiling component and information concerning multiple types of processor components that enables each of the one or more secure controllers to generate the different versions of the compiled routine from the task routine for each of the types of processor component on which the others of the secure controllers are based. Each of the secure controllers may be provided with indications of the types of processor components that the others of the secure controllers are based on during such exchanges of information as part of cooperating to determine which of the secure controllers is to compile the task routine. Indeed, in some embodiments, a criterion in selecting one of the secure controllers to perform such compiling may be the fact of which one(s) of the secure controllers is provided with such a compiling component and information concerning all of the types of processor components that are present among all of the secure controllers.

Following such compiling, the selected one of the secure controllers may distribute the different versions of the resulting compiled routine among the others of the secure controllers to enable execution of at least a portion thereof by each. The secure controllers may again exchange information concerning the available processing, storage and/or other resources of each thereamong as part of cooperating to determine which secure controller(s) are to execute which portion(s) of their respective versions of the compiled routine to cause a distributed performance of the functions of the task routine. In some embodiments, such exchanges of information may take place on a recurring basis to allow such information to be recurringly updated as the degree to which such resources are available within each of the secure controllers changes over time. Such aspects of the status of each of the secure controllers may change as a result of the performance of various other functions unrelated to the task routine by each of the secure controllers. Stated differently, the availability of resources of each of the secure controllers for compiling the task routine and/or performing one or more functions thereof may change over time.

Also, in some embodiments, which ones of the multiple secure controllers are present on the network of the secure processing system may also change over time. By way of example, at least a portion of the network extending thereamong may be a wireless network and one or more of the secure controllers may be incorporated into computing devices that are portable to at least some degree such that one or more of the secure controllers may be caused to leave and/or return to being present on the network at various times. As a result of such changes in which secure controllers are present on the network and/or of such changes in what resources each of those secure controllers are able to provide, the selections of which secure controller compiles the task routine and/or of which secure controllers perform one or more functions of the task routine may be recurringly re-evaluated. Stated differently, such selections may be made dynamically.

Further, in some embodiments, the compiling of the task routine and the performance of at least some of the functions of the task routine by various ones of the multiple secure controllers may be occur at least partly in parallel. More specifically, as one of the secure controllers compiles one portion of the task routine, one or more others of the secure controllers may execute one or more other previously compiled portions thereof (in the form of portions of different versions of compiled routine) to perform the one or more functions thereof. This may occur in embodiments in which just-in-time compiling and/or speculative compiling techniques are employed.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a secure processing system 1000 incorporating one or more of computing devices 200a, one or more of computing devices 200b, and/or a server 500, each of which may incorporate a secure controller. In the secure processing system 1000, a secure controller of one of the computing devices 200a, 200b or 500 is selected to compile at least a portion of a task routine 110 to generate multiple versions of a compiled routine 770. The secure controllers of the computing devices 200a, 200b and/or 500 may exchange portions of device data 430 concerning processing, storage and/or other resources available within each of those secure controllers to determine which of those secure controllers is to compile at least a portion of the task routine 110 and/or execute at least a portion of a corresponding version of the compiled routine 770. Upon compiling at least a portion of the task routine 110, the secure controller selected to compile at least a portion of the task routine 110 may distribute at least a portion of one or more versions of the compiled routine 770 to others of the secure controllers for execution by one or more of the secure controllers in a distributed manner to perform one or more of the functions of the task routine 110.

As depicted, these computing devices 200a, 200b and/or 500 may exchange the task routine 110, portions of the device data 430 and/or versions of the compiled routine 770 through a network 999. Also, one or more of these exchanged items may be so exchanged in encrypted form to prevent reading and/or modification thereof. However, one or more of these computing devices may exchange other data entirely unrelated to the compiling and/or performance of functions of the task routine 110 with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, each of the computing devices 200a and/or 200b incorporates one or more of a processor component 250, a storage 260 and an interface 290 to couple each of these computing devices to the network 999. Each of the computing devices 200a (if any are present in the secure processing system 1000) further incorporates a secure controller 300a that incorporates one or more of a processor component 350 and a storage 360. Within each of the computing devices 200a, the storage 260 may store a control routine 240, and the storage 360 may store one or more of the task routine 110, a version of the control routine 340, a version of the device data 430, and/or one or more versions of the compiled routine 770. The processor component 350 and the storage 360 may provide a secure processing environment for the execution of the control routine 340 and/or a version of the compiled routine 770 that is isolated from the processing environment provided by the processor component 250 and the storage 260. In some embodiments, the secure controller 300a may not have independent access to the interface 290 such that the processor component 250 may be caused by its execution of the control routine 240 to relay pieces of data and/or routines between the secure controller 300a and the interface 290.

In contrast the inclusion of the secure controller 300a in each of the computing devices 200a, the processor component 250 of each of the computing devices 200b (if any are present in the secure processing system 1000) may provide a virtual secure controller 300b. Specifically, the processor component 250 may incorporate support for maintaining a secure enclave 265 within a portion of the storage 260 that the processor component 250 may protect from being accessed by other routines that are not stored therein. The processor component 250 may also incorporate support for executing a routine stored within the secure enclave 265 in a manner that is isolated from the execution of other routines that are not stored within the secure enclave 265. Thus, one or more of the task routine 110, a version of the control routine 340, a version of the device data 430, and/or one or more versions of the compiled routine 770 may be stored within the secure enclave 265 to be made inaccessible to other routines not stored therein. Further, the processor component 250 may execute the control routine 340 and/or a version of the compiled routine 770 in isolation from other routines executed by the processor component 250, thereby providing a secure processing environment that serves as the virtual secure controller 300b. In some embodiments, the control routine 240 may cause the processor component 250 to provide the secure enclave upon being executed by the processor component 250.

In various embodiments, each of the server 500 (if present within the secure processing system 1000) incorporates one or more of a processor component 550, a storage 560 and an interface 590 to couple the server 500 to the network 999. The storage 560 may store one or more of an account database 530 and a control routine 540. The control routine 540 may incorporate a virtual machine (VM) hypervisor routine that, when executed by the processor component 550, causes the processor component 550 to generate one or more virtual machines, each of which may be allocated a separate portion of the storage 560, and each of which may serve as a virtual secure controller 600. As will be explained in greater detail, the server 500 may provide one of the virtual secure controllers 600 for each of multiple secure processing systems, including the secure processing system

1000. Such provision of one of the virtual secure controllers 600 by the server 500 for inclusion in the secure processing system 1000 may be done as part of a paid service provided by the operator of the server 500. Information concerning each such secure processing system (including the secure processing system 1000) may be maintained in a separate entry within the account database 530. Stored within the portion of the storage 560 allocated to the one of the virtual controllers 600 associated with the secure processing system 1000 may be stored one or more of the task routine 110, a control routine 640, a version of the device data 430, and/or one or more versions of the compiled routine 770.

In executing the control routine 340, the processor component 350 of the secure controller 300*a* of one of the computing devices 200*a* may operate its corresponding interface 290 to receive the task routine 110 via the network 999 from another computing device (not shown), and may store the task routine 110 within the storage 360 for subsequent execution. Alternatively, in executing the control routine 340, the processor component 250 of one of the computing devices 200*b* may operate its corresponding interface 290 to so receive the task routine 110, and may store the task routine 110 within the secure enclave 265 for subsequent execution. However, performance of the functions of the task routine 110 may require greater processing, storage and/or other resources than available within any one of the secure controllers 300*a*, 300*b* or 600. Alternatively or additionally, performance of the functions of the task routine 110 may require features such as specific input/output devices, pieces of data and/or other resources that are not all available to a single one of the secure controllers 300*a*, 300*b* or 600. For these and/or for other reasons, it may be deemed desirable to compile and execute the task routine 110 in a manner in which the performance of its functions is distributed across multiple ones of the secure controllers 300*a*, 300*b* and/or 600.

In some embodiments, the task routine 110 may be made up of instructions in text form that must be compiled to enable execution by multiple ones of the processor components 250, 350 and/or 550. By way of example, the task routine 110 may be written in the Java programming language promulgated by Oracle Corporation of Redwood Shores, Calif., USA. However, as previously discussed, among the processor component(s) 350 of each secure controller 300*a* of each computing device 200*a*, the processor component(s) 250 providing the virtual secure controller 300*b* within each computing device 200*b*, and the processor component 550 providing the virtual secure controller 600 within the server 500 may be multiple different types of processor components. More specifically, among all of those processor components may be different processor components with different instruction sets such that it may not be possible to generate a single version of the compiled routine 770 that is able to be executed by all of those processor components. Alternatively or additionally, among all of those processor components may be different versions of processor components that may share a substantial portion of a single instruction set, but with various useful instruction set features or other features that are unique to one or more of those processor components. Thus, it may be possible to generate a single version of the compiled routine 770 that is executable by those different types of processor components, but only by sacrificing opportunities to take advantage of those unique features.

In further executing corresponding ones of the control routines 340 and 640, the processor component(s) 350 of each secure controller 300*a*, the processor component(s) 250 providing each virtual secure controller 300*b*, and the processor component 550 providing the virtual secure controller 600 may operate corresponding ones of the interfaces 290 and 590 to exchange portions of the device data 430 through the network 999. Again, the exchanged portions of the device data 430 may specify processing, storage and/or other resources currently available from each of the secure controllers 300*a*, 300*b* and/or 600. As previously discussed, such exchanges of portions of the device data 430 may take place on a recurring basis to accommodate changes in the availability of such resources over time as part. One of such exchanges of may take place as part of the processor components 250, 350 and/or 550 cooperating to determine which secure controller of the multiple secure controllers 300*a*, 300*b* and/or 600 is selected to compile the task routine 110. Following such a selection, if the selected one of the secure controllers 300*a*, 300*b* and/or 600 is not already provided with the task routine 110, another of these secure controllers may transmit the task routine 110 to the selected one of these secure controllers via the network 999.

As previously discussed, in compiling the task routine 110, the selected one of secure controllers 300*a*, 300*b* and/or 600 may generate multiple versions of the compiled routine 770 to accommodate differences among the processor components 250, 350 and/or 550. In so doing, the selected one of the secure controllers 300*a*, 300*b* and/or 600 may employ indications within the device data 430 of all of the types of processor components that exist within all of the secure controllers 300*a*, 300*b* and/or 600 currently present within the secure processing system 1000. Thus, in embodiments in which portions of the device data 430 are exchanged on a recurring basis to provide updated indications of resources available within each of the secure controllers 300*a*, 300*b* and/or 600, a change in what secure controllers are present within the secure processing system 1000 such that they are accessible via the network 999 may be reflected in new portions of the device data 430 received by the selected one of these secure controllers such that the selected one of these secure controllers may change what versions of the compiled routine 770 are generated during compiling.

The compiling of the task routine 110 to generate multiple versions of the compiled routine 770 may require considerable processing, storage and/or other resources to perform. In some embodiments, the one of the secure controllers 300*a*, 300*b* and/or 600 that is selected to do so may be so selected based on having more processing, storage and/or other resources to do so than any of the others of these secure controllers. As previously discussed, the provision of the virtual secure controller 600 may be as part of a paid service provided by the operator of the server 500. Depending on the level of the service that is paid for, it may be that the virtual secure controller 600 is configured within the server 500 to more consistently have greater available processing, storage and/or other resources than any of the secure controllers 300*a* or 300*b* that may be present within the secure processing system 1000 at any given time. As a result, the virtual secure controller 600 may repeatedly be selected to compile the task routine 110.

However, it may be that the level of payment for the provision of the virtual secure controller 600 is based on the degree to which the virtual secure controller 600 is used such that it may be deemed desirable to reserve the use of the virtual secure controller 600 for occasions where none of the other secure controllers 300*a* or 300*b* that may be present within the secure processing system 1000 have sufficient processing, storage and/or other resources to perform a particular function. Alternatively or additionally, the server 500 may be situated at a location that is at a considerable distance from the rest of the secure controllers 300a and/or 300b, which may more closely co-located. By way of example, at least the majority of the secure controllers 300a and/or 300b may be located within and/or in close proximity to a single structure (e.g., a house or a place of business), while the server 500 may be sufficiently remotely located as to require the use of the Internet to extend the network 999 between the server 500 and the computing devices 200a and/or 200b into which the secure controllers 300a and/or 300b are incorporated. As a result, there may be concerns about the reliability and/or level of security of the portion of the network 999 that couples the virtual secure controller 600 provided by the server 500 to the other secure controllers 300a and/or 300b of the secure processing system 1000. Thus, in some embodiments, for reasons of economy, reliability of access to the server 500, degree of security in communications with the server 500 and/or other reasons, it may be deemed desirable to select one of the secure controllers 300a and/or 300b to compile the task routine 110 at time when at least one of the secure controllers 300a and/or 300b has sufficient available processing, storage and/or other resources to do so. In such embodiments, the virtual secure controller 600 may be selected to compile the task routine 110 at times when none of the secure controllers 300a and/or 300b currently present in the secure processing system 1000 has sufficient processing, storage and/or other resources to do so.

Regardless of which secure controller is selected to compile the task routine 110, following such compiling, that selected one of the secure controllers 300a, 300b and/or 600 may distribute the different versions of the compiled routine 770 among the others of these secure controllers to enable distributed performance of the functions of the task routine 110 through distributed execution of various portions of different versions of the compiled routine 770 by different ones of these secure controllers.

In preparation for such execution, the secure controllers 300a, 300b and/or 600 may again exchange portions of the device data 430 concerning the available processing, storage and/or other resources of each. Such an exchange theramong may be performed as part of the processor components 250, 350 and/or 550 of corresponding ones of the secure controllers 300a, 300b and/or 600 cooperating to determine which of these secure controllers are selected to perform each of the various functions of the task routine 110. More precisely, with all of the versions of the compiled routine 770 including portions of executable instructions to perform each of the various functions of the task routine 110, the secure controllers 300a, 300b and/or 600 may cooperate to determine which of those portions in each of the versions of the compiled routine 770 is to be executed by a corresponding one of these secure controllers. In making such selections, the availability of processing, storage and/or other resources within each of the secure controllers 300a, 300b and/or 600 may be taken into account. Thus, a one of the security controllers 300a, 300b and/or 600 with considerable available resources may be selected to perform a function of the task routine 110 associated a portion of instructions in all of the versions of the compiled routine 770 that requires considerable resources to be executed, while another of the security controllers 300a, 300b and/or 600 with lesser available resources may be selected to perform a different function of the task routine 110 associated with a different portion of instructions in all of the versions of the compiled routine 770 that requires lesser resources to be executed. In this way, the performance of different functions of the task routine 110 may be distributed among the secure controllers 300a, 300b and/or 600 by the selection of different ones of these controllers to perform portions of instructions of the different versions of the compiled routine 770 that are associated with those different functions. As each of the secure controllers 300a, 300b and/or 600 complete their respective performances of whatever functions of the task routine 110 are assigned to each, one or more of the secure controllers 300a, 300b and/or 600 may transmit an indication of the results of their respective performances to one or more others of these secure controllers. This may be done to enable the performance of a task that requires the results of the performance of another task to receive the results of the performance of that other task.

As previously discussed, which ones of the secure controllers 300a, 300b and/or 600 are available within the secure processing system 1000 may change over time. More specifically, different ones of the computing devices 200a, 200b and/or 500 that incorporate corresponding ones of the secure controllers 300a, 300b and/or 600 may be present on the network 999 at different times. As recognizable to those skilled in the art, such changes over time may arise from failures in different portions of the network 999 and/or in different ones of the computing devices 200a, 200b and/or 500. Alternatively or additionally, different ones of the computing devices 200a, 200b and/or 500 may be turned on or off. Also alternatively or additionally, different ones of the computing devices 200a, 200b and/or 500 may be connected to and/or disconnected from the network 999 at different times. Again, this may occur where at least a portion of the network 999 is a wireless network and at least a subset of these computing devices are portable such that they may be transported into or out of range of any portion of the network 999. In support of such changing availability of secure controllers, and as previously discussed, the exchanges of portions of the device data 430 may be performed on a recurring basis as a mechanism to provide current information to each secure controller that includes what secure controllers are currently within the secure processing system 1000 and what resources are each able to provide.

More generally, in various embodiments, each of these computing devices 200a, 200b and 500 may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc. In various embodiments, each of the processor components 250, 350 and 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 260, 360 and 560 may be based on any of a wide variety of information storage technologies. Such technologies may include volatile technologies requiring the uninterrupted provision of electric power and/or technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 290 and 590 may each employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2A:
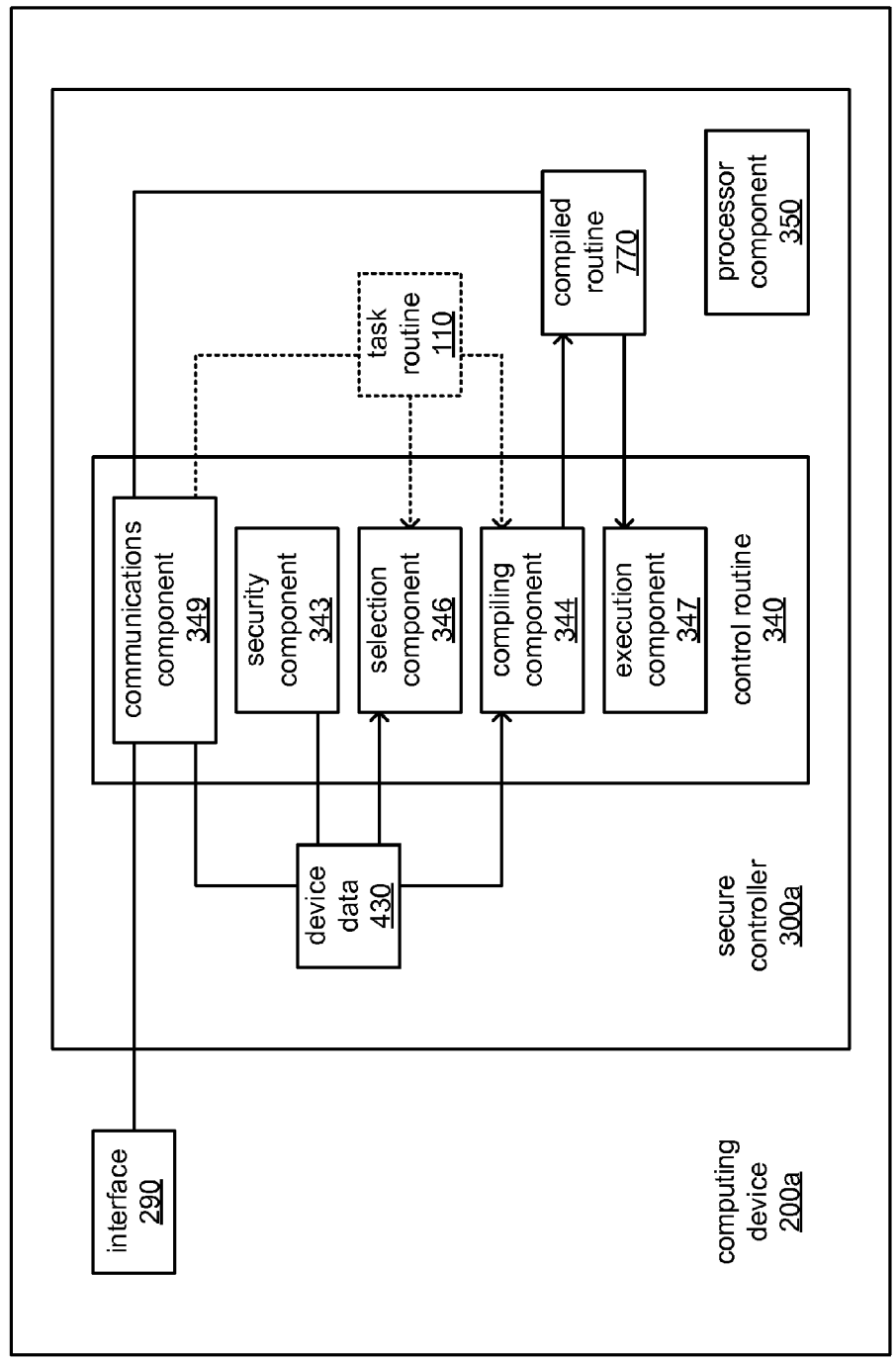
FIGS. 2A, 2B and 2C each illustrates a portion of an example embodiment.
Figure 2B:
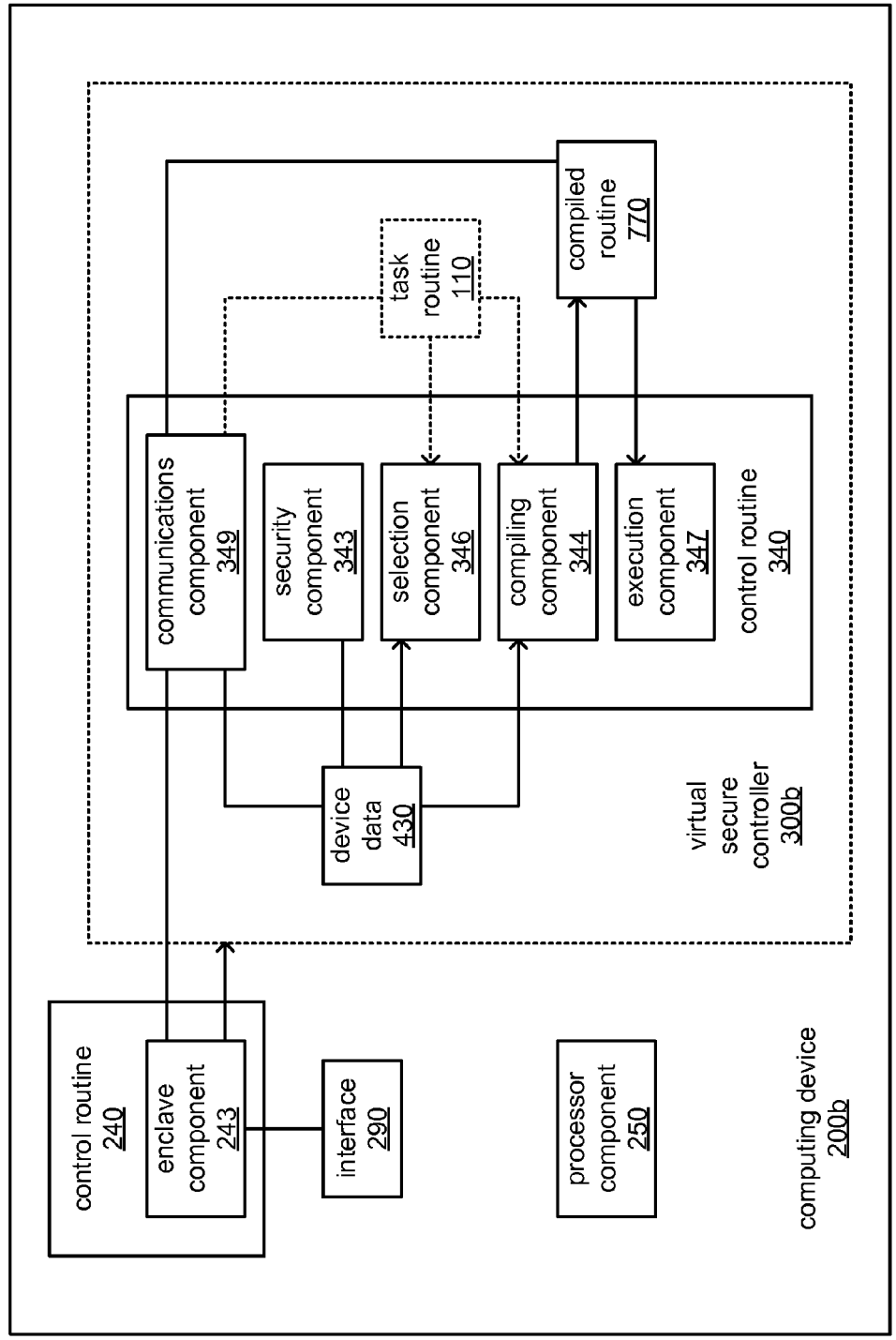
Figure 2C:
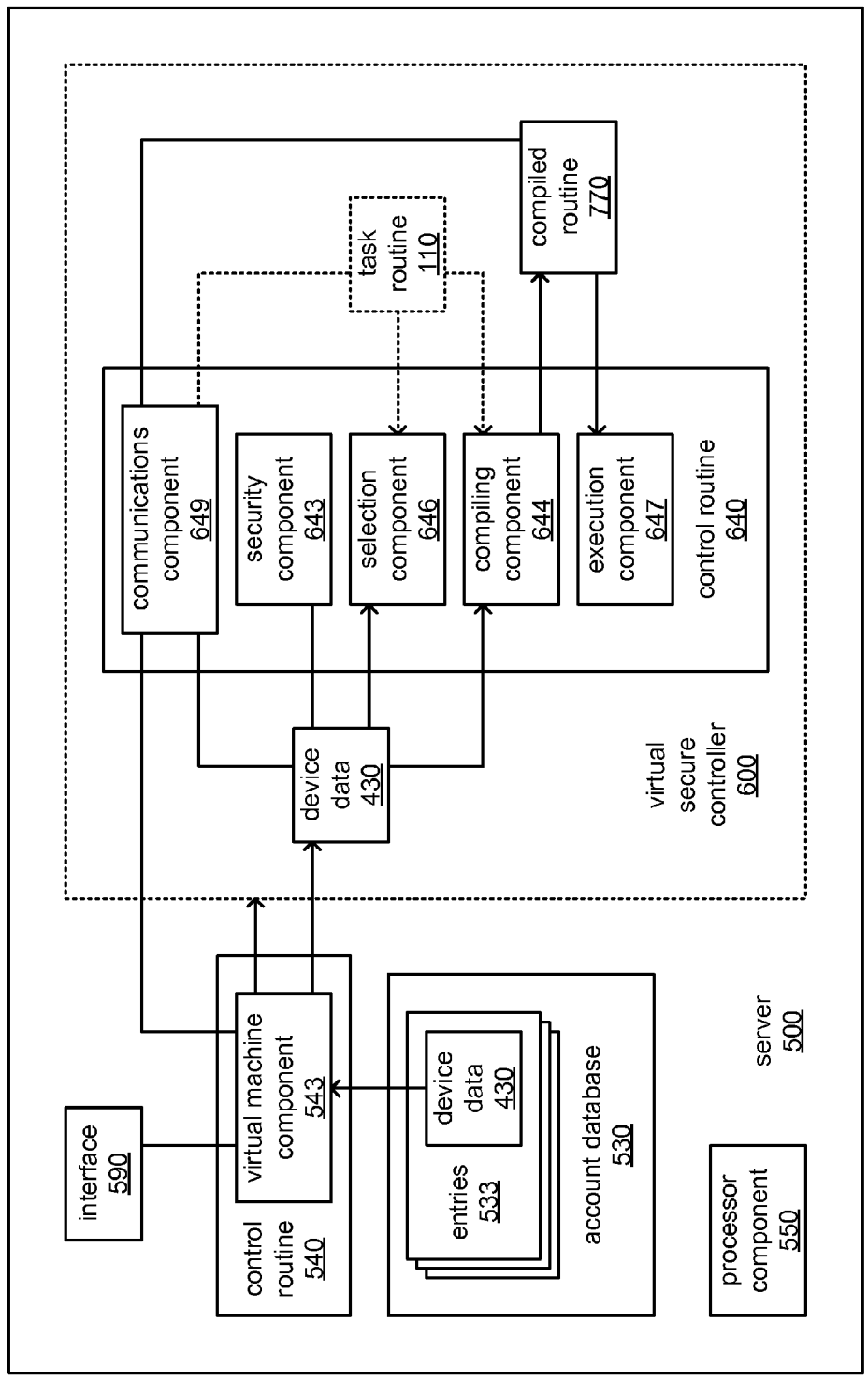

FIGS. 2A-C each illustrate a block diagram of a portion of an embodiment of the secure processing system 1000 of FIG. 1 in greater detail. More specifically, FIG. 2A depicts aspects of the operating environment of an example embodiment of one of the computing devices 200a in which the processor component 350 of the secure controller 300a selectively compiles and/or executes at least a portion of the task routine 110. FIG. 2B depicts aspects of the operating environment of an example embodiment of one of the computing devices 200b in which the processor component 250 provides the virtual secure controller 300b in which the processor component 250 selectively compiles and/or executes at least a portion of the task routine 110. FIG. 2C depicts aspects of the operating environment of an example embodiment of the server 500 in which the processor component 550 provides a virtual secure controller 600 in which the processor component 550 selectively compiles and/or executes at least a portion of the task routine 110. As recognizable to those skilled in the art, the control routines 240, 340, 540 and 640, including the components of which each is composed, are selected to be operative on whatever type of processor or processors that are selected to implement applicable ones of the processor components 250, 350 or 550.

Turning more specifically to FIG. 2A, as previously described, each of the computing devices 200a incorporates a corresponding one of the secure controllers 300a, which incorporates a separate controller processor component 350 from the main processor component 250 of the computing device 200a. Thus, the versions of the control routine 340 within each of the secure controllers 300a may include any of a variety of operating systems, applications routines, compilers and/or device drivers selected to be appropriate for the controller processor component 350 incorporated therein. As also previously described, each of the secure controllers 300a, 300b and/or 600 may employ a processor component that differs from the processor components of others of the secure controllers to a greater or lesser degree in their instruction sets and/or in other features. Thus, it may be that the processor components 350 in different ones of the secure controllers 300a may differ in their instruction sets and/or in other features such that the control routines 340 in different ones of the secure controllers 300a may be different versions selected to be appropriate for the instruction set and/or other features of a corresponding one of the processor components 350.

Turning more specifically to FIG. 2B, as previously described, the main processor component 250 of each of the computing devices 200b may incorporate support for the instantiation of a secure enclave 265 that, in turn, supports the instantiation of a virtual secure controller 300b in which the processor component 250 executes a version of the control routine 340 in a secure environment. Thus, the versions of the control routine 340 within each of the virtual secure controllers 300b may include any of a variety of operating systems, applications routines, compilers and/or device drivers selected to be appropriate for the main processor component 250 of a corresponding one of the computing devices 200b. Again, since each of the secure controllers may employ a processor component that differs from the processor components of others of the secure controllers to a greater or lesser degree in their instruction sets and/or in other features, it may be that the main processor components 250 in different ones of the computing devices 200b may be different in their instruction sets and/or in other features such that the control routines 340 within different ones of the virtual secure controllers 300b may be different versions selected to be appropriate for the instruction set and/or other features of a corresponding one of the main processor components 250.

Turning more specifically to FIG. 2C, as previously described, the processor component 550 of the server 500 executes the control routine 540, which may cause the processor component 550 to instantiate one or more VM sessions that each support a virtual secure controller 600 in which the processor component 550 executes a version of the control routine 640 in a secure environment. In some embodiments, each of the virtual secure controllers 600 may include a processing environment based on the instruction set of the main processor component 550 such that each of the versions of the control routine 640 within each of the virtual secure controllers 600 may be relatively similar. However, in other embodiments, the main processor component 550 may be caused by its execution of the control routine 540 to emulate one or more other processor components with different instruction sets and/or other different features in providing one or more of the virtual secure controllers 600. Thus, in such embodiments, different ones of the virtual secure controllers 600 may incorporate greatly different versions of the control routine 640 selected to be appropriate for one or more other processor components that are emulated by the processor component 550.

Turning to all three of FIGS. 2A-C, the control routine 640 and each of the versions of the control routine 340 may include a communications component 649 or 349, respectively, that is executed by a corresponding one of the processor components 650, 350 or 250 to operate a corresponding one of the interfaces 590 and 290. Among those signals may be signals conveying various security credentials (e.g., device identifiers, encryption keys, access credentials, etc.), indications of required and/or available resources, the task routine 110 and/or various versions of the compiled routine 770, as described herein. As will be recognized by those skilled in the art, each of these communications components is selected to be operable with whatever type of interface technology is selected to implement corresponding ones of the interfaces 290 or 590.

The control routine 640 and each of the versions of the control routine 340 may include a security component 643 or 343, respectively, that is executed by a corresponding one of the processor components 650, 350 or 250 to restrict communications to secure controllers that are part of the secure processing system 1000. In some embodiments, various ones of the secure controllers 300a, 300b and/or 600 that make up of the secure processing system 1000 may be added over time, with each new added secure controller being caused to exchange security credentials with at least one other of the secure controllers 300a, 300b and/or 600 already included in the secure processing system 1000. Such exchanges of security credentials may then be propagated among more of the secure controllers 300a, 300b and/or 600 to enable each of these secure controllers to recognize any of the others as a member of the secure processing system 1000, and therefore, accepted as a secure controller with which to cooperate to compile and/or execute the task routine 110. Alternatively or additionally, such exchanges of security credentials may enable the encrypting and decrypting of pieces of data and/or of routines exchanged among the secure controllers 300a, 300b and/or 600 via the network 999, including and not limited to, portions of the exchange data 430, the task routine 110 and/or version(s) of the compiled routine 770.

In other embodiments, the server 500, in addition to providing the virtual secure controller 600 to the secure processing system 1000, may also serve as an issuer of security credentials to the other secure controllers 300a and/or 300b as part of forming the secure processing system 1000. More precisely, an operator of multiple ones of the computing devices 200a and/or 200b may log into an account maintained in connection with the server 500 and associated with the secure processing system 1000 through each of those computing devices to add the secure controllers 300a and/or 300b within those computing devices to the secure processing system 1000 by causing the server 500 to issue security credentials to each of those secure controllers. In so doing, the server 500 may also function as an exchange point through which the various secure controllers 300a and/or 300b that are added to the secure processing system 1000 exchange security credentials to subsequently allow each of those secure controllers 300a and/or 300b to directly recognize each other as belonging to the secure processing system 1000 such that the network 999 may be formed therebetween as a peer-to-peer and/or ad-hoc network. Thus, following such an exchange of security credentials, the server 500 may only need to be contacted to add the virtual secure controller 600 to the secure controllers of the secure processing system 1000 that are available on the network 999 when the resources of the virtual secure controller 600 are needed.

FIG. 3 depicts an example of such an exchange of security credentials in which sets of the exchanged security credentials may be stored within each of the secure controllers 300a, 300b and/or 600 as part of the separate versions of the device data 430 maintained within each of these secure controllers concerning various aspects of thereof. More precisely, the security components 343 and/or 643 of corresponding ones of the security controllers 300a, 300b and/or 600 may exchange portions of the various versions of the device data 430 stored within each that include security credentials to enable formation of the secure processing system 1000 thereamong through the network 999. As part of exchanging portions of the device data 430, the secure controllers 300a, 300b and/or 600 may also exchange indications of processing, storage and/or other resources of each of those secure controllers. As previously explained, the server 500 may maintain a version of the device data 430 as part of an entry 533 associated with the secure processing system 1000 within the account database 530 for subsequent retrieval to instantiate the secure controller 600 for use as part of the secure processing system 1000.

Returning to FIGS. 2A-C, the control routine 640 and each of the versions of the control routine 340 may include a selection component 646 or 346, respectively, that is executed by a corresponding one of the processor components 650, 350 or 250 to determine which one of the secure controllers 600, 300b and/or 300a are to compile the task routine 110. As previously discussed, whichever one of the secure controllers 300a, 300b and/or 600 has a copy of the task routine 110 may analyze one or more aspects of the task routine 110 to determine what resources are required to compile at least a portion of the task routine 110. Following such an analysis, the secure controllers 300a, 300b and/or 600 currently present on the network 999 may then cooperate to determine which of those secure controllers is to be selected to compile at least a portion of the task routine 110. Such cooperation may entail an exchange of portions of the device data 430 thereamong that provide indications of what resources are currently available within each of those secure controllers. As previously explained, this may be done on a scheduled recurring basis and/or if there hasn't been such an exchange sufficiently recently to support making such a selection.

Returning to FIG. 3, in some embodiments, the selection component 346 or 646 of the secure controller that has a copy of the task routine 110 may compare the required resources to what resources are available within each of the secure controllers 300a, 300b and 600, as indicated in its version of the device data 430. Through such a comparison, the selection component 346 or 646 of that secure controller may select one of the secure controllers 300a, 300b and/or 600 that is best able to compile the task routine 110. If the selected secure controller is a different secure controller, then the selection component 346 or 646 of the secure controller that has a copy of the task routine 110 may transmit a copy of the task routine 110 to that selected one of the secure controllers to enable the selected secure controller to compile the task routine 110. In some of such embodiments, the virtual secure controller 600 provided by the server 500 may not be considered for use in compiling the task routine 110 unless none of the other secure controllers 300a and/or 300b have sufficient resources currently available to do so. As previously discussed, limiting the use of the virtual secure controller 600 provided by the server 500 to such situations may be deemed desirable where use of the virtual secure controller 600 is subject to financial costs tied to the degree to which the virtual secure controller 600 is used.

In other embodiments, the selection component 346 or 646 of the secure controller that has a copy of the task routine 110 may transmit an indication of what resources are required to compile the task routine 110 to others of the secure controllers 300a, 300b and/or 600 that are currently available on the network 999. Following such a distribution of an indication of the required resources, the selection components 346 or 646 of each of those secure controllers may each independently determine whether each of those secure controllers has the required resources available, and then each may signal the one secure controller that has the copy of the task routine 110 with the results of those independent comparisons.

It should be noted that another factor that may be employed by one or more of the selection components 346 or 646 of one or more of the secure controllers 300a, 300b and/or 600 may be indications that may be included in exchanged portions of the device data 430 of the type and/or characteristics of the portion of the network 999 to which each of the computing devices 200a, 200b and/or 500 may be coupled. Such indications may include a rating of the reliability of the connection that each of these computing devices has to the network 999, a data transfer speed, whether the connection is a wireless or wired connection, etc. Alternatively or additionally, the exchanged portions of the device data 430 may include indications of geographic location of each of the computing devices 200a, 200b and/or 500. This may be done as part of evaluating the latencies of transmissions through different portions of the network 999 for each of the computing devices 200a, 200b and/or 500, as a significantly greater geographic distance may correlate to a significantly greater latency.

Returning to FIGS. 2A-C, the control routine 640 and each of the versions of the control routine 340 may include a compiling component 644 or 344, respectively, that is executed by a corresponding one of the processor components 550, 350 or 250 to compile the task routine 110 in whichever one of the secure controllers 600, 300b or 300a is selected to do so. As previously discussed, the compiling component 344 or 644 that compiles the task routine 110 may generate multiple versions of the compiled routine 770 to accommodate differences in instruction sets and/or other features of the processor components 250, 350 and/or 550 associated with corresponding ones of the secure controllers 300a, 300b and/or 600. Indeed, a factor in selecting one of the secure controllers 300a, 300b and/or 600 to compile at least a portion of the task routine 110 may be whether or not the compiling component 344 or 644 of a particular one of the secure controllers is capable of generating all of the versions of the compiled routine 770 that are needed given the variety of types of processor components that may exist in the secure processing system 1000 at that time. As also previously discussed, the compiling of the task routine 110 may be entail compiling portions of the task routine 110 at a time, instead of compiling all of the task routine 110 in a single compiling operation.

Figure 4:
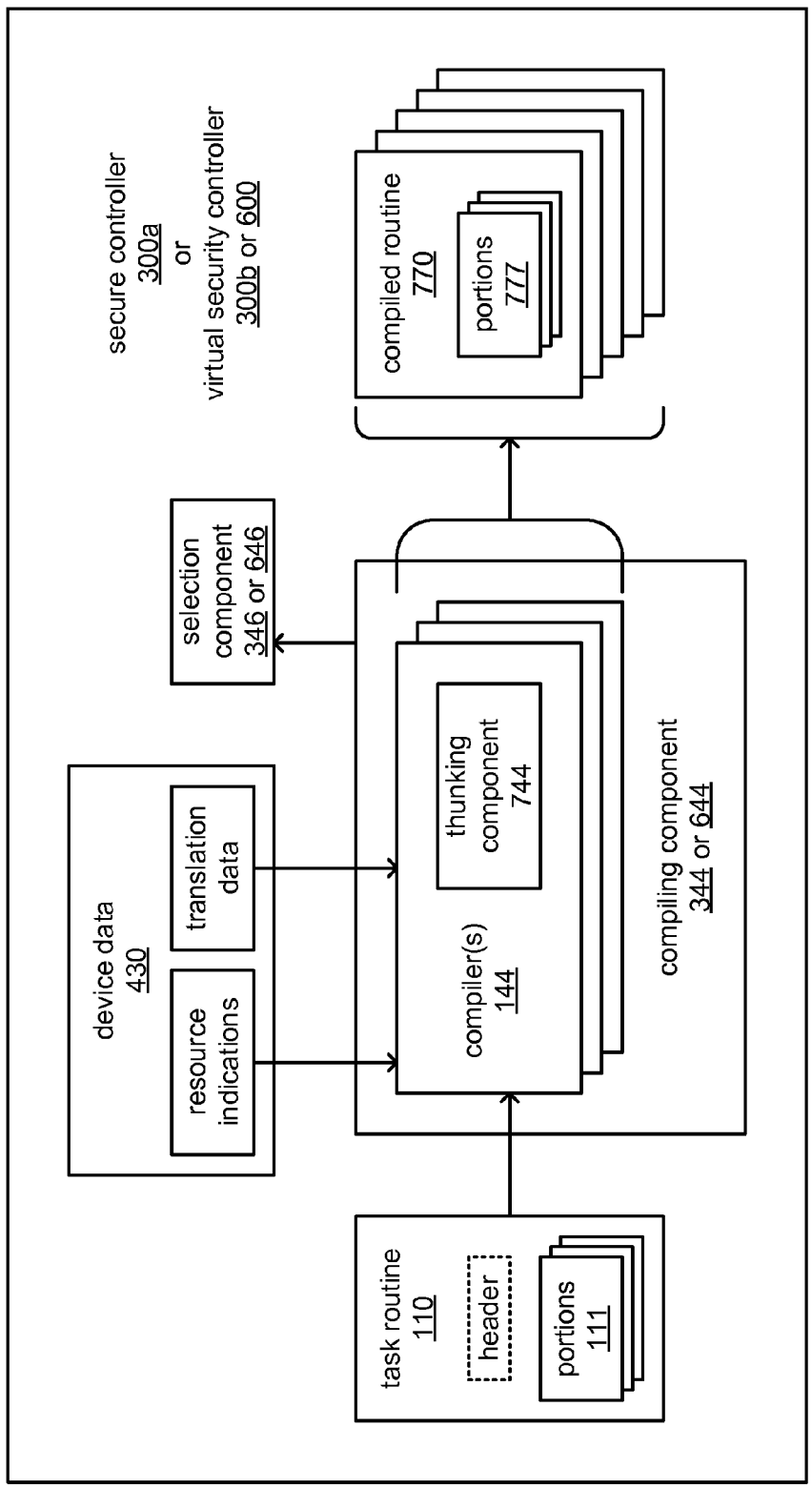
FIG. 4 illustrates an example of compiling by a secure controller.

FIG. 4 depicts an example of preparations for and/or performance of such compiling of the task routine 110 by one of the compiling components 344 or 644 of a corresponding one of the secure controllers 300a, 300b and/or 600. In some embodiments, it may be the compiling component 344 or 644 of whichever one of the secure controllers 300a, 300b and/or 600 that has a copy of the task routine 110 that analyzes various aspects of the task routine 110 to determine what resources are required to compile the task routine 110. As previously discussed, the task routine 110 may include a header and/or various instructions that explicitly indicate various requirements for compiling the task routine 110, such as a type or version of compiler to use, one or more specific libraries of supporting routines that must be available for compiling, a data size of the largest data structure declared or otherwise employed by the task routine 110, etc. Such a header and/or various instructions may also provide an indication of the manner in which the task routine 110 may be divisible into portions 111 that are each associated with a distinct function and/or are in some other manner able to be separately compiled to create separate portions 777 of each version of the compiled routine 770. Upon determining one or more of the various resources required to compile the task routine 110, the compiling component 344 or 644 of the secure controller 300a, 300b or 600 that has a copy of the task routine 110 may then provide an indication of those requirements to a corresponding selection component 346 or 646.

It should also be noted that, since it may be that only portions 111 of the task routine 110 may be compiled at a time, it may be that the compiling component 344 or 644 of different ones of the secure controllers 300a, 300b and/or 600 may be selected to compile differ portions 111 of the task routine 110. This may occur as a result of variations in the available resources of each of the secure controllers 300a, 300b and/or 600 over time such that one of these secure controllers that was able to compile at least one portion 111 at one time is subsequently without the resources needed to compile another of the portions 111 at a later time. Thus, the analysis of the resources required to compile the task routine 110 may be a per-portion analysis performed by the compiling component 344 or 644 of the secure component that has the copy of the task routine 110, and each of those separate analyses may be provided to the corresponding selection component 344 or 644 to enable the selection of which secure controller is to compile each of the portions 111 of the task routine 110.

Following selection of one of the secure controllers 300a, 300b or 600 to compile at least one of the portions 111 of the task routine 110, the compiling component 344 or 644 of that selected one of the secure controllers may retrieve indications of resources available within each of the secure controllers 300a, 300b and/or 600 to determine the types of processor components that are incorporated into the secure controllers 300a, 300b and/or 600 that are currently present on the network 999. As depicted, the compiling component 344 or 644 may include multiple compilers 144 to separately and/or at least partially in parallel compile at least a portion 111 of the task routine 110 into a different version of the compiled routine 770 for execution by a processor component with an instruction with an instruction set sufficiently different from the others that no one version of the compiled routine 770 would be executable by all. The compiling component 344 or 644 may use the indications of what type of processor components are incorporated into the secure controllers 300*a*, 300*b* and/or 600 that are currently present on the network 999 to determine what versions of the compiled routine 770 to generate, and therefore, what compilers 144 to use in generating those versions.

Alternatively or additionally, and as also depicted, at least one of the compilers 144 may include a thunking component 744 to translate one version of the compiled routine 770 generated for one type of processor component into another version for another processor component with a relatively similar instruction set, but which may have one or more unique features that are deemed desirable to make use of. In some embodiments, the thunking component 744 may retrieve translation data providing indications of correlations between different instructions from the device data 430. The thunking component 744 may retrieve different ones of such indications depending on the particular type of processor component that a version of the compiled routine 770 was originally generated for versus the type of processor of processor component that the translated version of the compiled routine 770 is to be generated for. Also, the choice of translations performed to generate new version(s) of the compiled routine 770 may be determined by indications retrieved from the device data 730 of what types of processor components exist among the secure controllers 300*a*, 300*b* and/or 600 that are currently present on the network 999.

Figure 5:
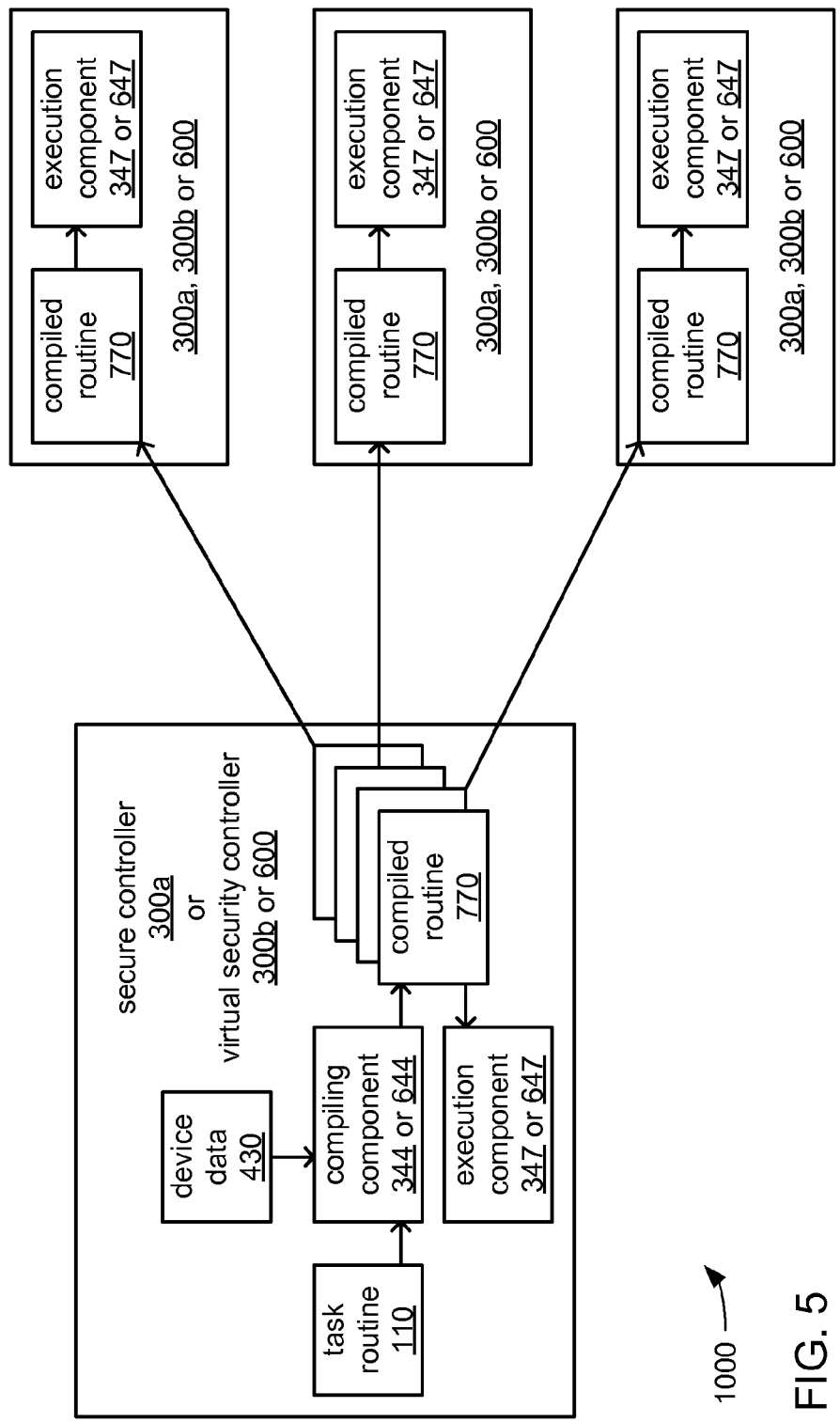
FIG. 5 illustrates an example of distribution of versions of a compiled routine by among secure controllers.

Thus, in some embodiments, multiple versions of the compiled routine 770 may be generated through the use of multiple distinct compiling operations and/or multiple translations performed by the compiling component 344 or 644 of one of the secure controllers 300*a*, 300*b* or 600. That compiling component 344 or 644 may subsequently distribute the different versions of the compiled routine 770 to the other secure controllers 300*a*, 300*b* and/or 600, as depicted in FIG. 5.

Returning to FIGS. 2A-C, the control routine 640 and each of the versions of the control routine 340 may include an execution component 647 or 347, respectively, that is executed by a corresponding one of the processor components 550, 350 or 250 to execute at least a portion of a corresponding version of the compiled routine 770. As previously discussed, following compiling of the task routine 110 into multiple versions, and following the distribution of those multiple versions among the secure controllers 300*a*, 300*b* and/or 600, those secure controllers may cooperate to determine which one(s) of those secure controllers are each to execute at least a portion of their respective versions of the compiled routine 770. Thus, and returning to FIG. 5, following the distribution of the multiple versions of the compiled routine 770, the execution component(s) 347 or 647 of one or more of any of the secure controllers 300*a*, 300*b* and/or 600, including the execution component 347 or 647 of the same secure controller in which compiling is performed, may be selected to execute at least a portion of a corresponding version of the compiled routine 770.

Figure 6:
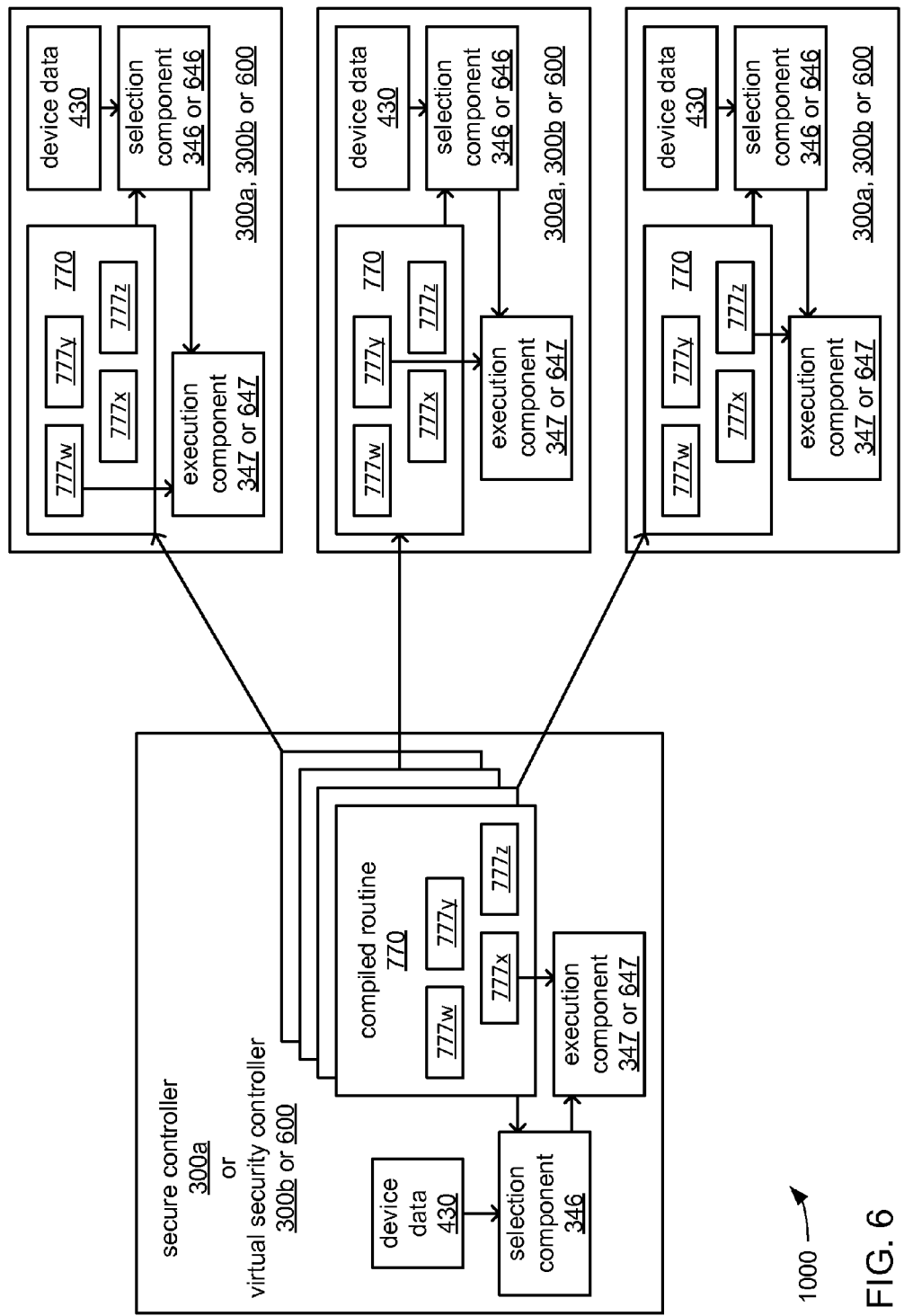
FIG. 6 illustrates an example of selecting secure controllers to execute different portions of different versions of a compiled routine.

FIG. 6 depicts an example of preparations for and/or performance of such execution of one or more versions of the compiled routine 770 by one or more corresponding ones of the execution components 347 or 647 of one or more of the secure controllers 300*a*, 300*b* and/or 600. As previously discussed, the task routine 110 may be made up of portions 111 that may be amenable to being compiled into distinct corresponding portions 777 of each of the versions of the compiled routine 770. As also previously discussed, following such compiling of the task routine 110 (or even while still more of the task routine 110 is being compiled), the secure controllers 300*a*, 300*b* and/or 600 may cooperate to determine which of those secure controllers is to execute each of the portions 777. More specifically, the selection components 346 and/or 646 of the secure controllers 300*a*, 300*b* and/or 600 may exchange and/or analyze portions of their respective versions of the device data 430 that include indications of available resources within each of those secure controllers to determine which of those secure controllers has the resources required to execute each of the portions 777.

In FIG. 6, each of the versions of the compiled routine 770 includes at least portions 777*w*, 777*x*, 777*y* and 777*z*. This manner of further identifying each of these portions 777 with a suffix w, x, y or z is meant to facilitate easier understanding in the discussion that follows, and should not be taken as an indication that each version of the compiled routine 770 must include exactly four portions 777. As depicted, the execution component 347 or 647 of each of the four depicted secure controllers 300*a*, 300*b* and/or 600 is selected to execute a different one of the portions 777*w*, 777*x*, 777*y* and 777*z*.

As previously discussed, as each of the execution components 347 or 647 completes execution of a respective one of the portions 777*w*-*z*, each of the execution components 347 or 647 may transmit an indication of the results of performing its respective one of the portions 777*w*-*z* to one or more others of the secure controllers 300*a*, 300*b* and 600. Again, such an exchange of indications of results may be needed where one of the portions 777*w*-*z* corresponds to a task of the task routine 110 that cannot be performed until an indication of the result of executing another of the portions 777*w*-*z* that corresponds to another task of the task routine 110 has been received such that it may be used as an input. By way of example, and referring to FIG. 6, it may be that the portion 777*y* of one of the versions of the compiled routine 770 is unable to be executed by the execution component 347 or 647 of one of the secure controllers 300*a*, 300*b* and/or 600 until the results of the execution of the portion 777*w* of another of the versions of the compiled routine 770 by the execution component 347 or 647 of another one of these secure controllers has been received from that other one of these secure controllers.

Figure 7:
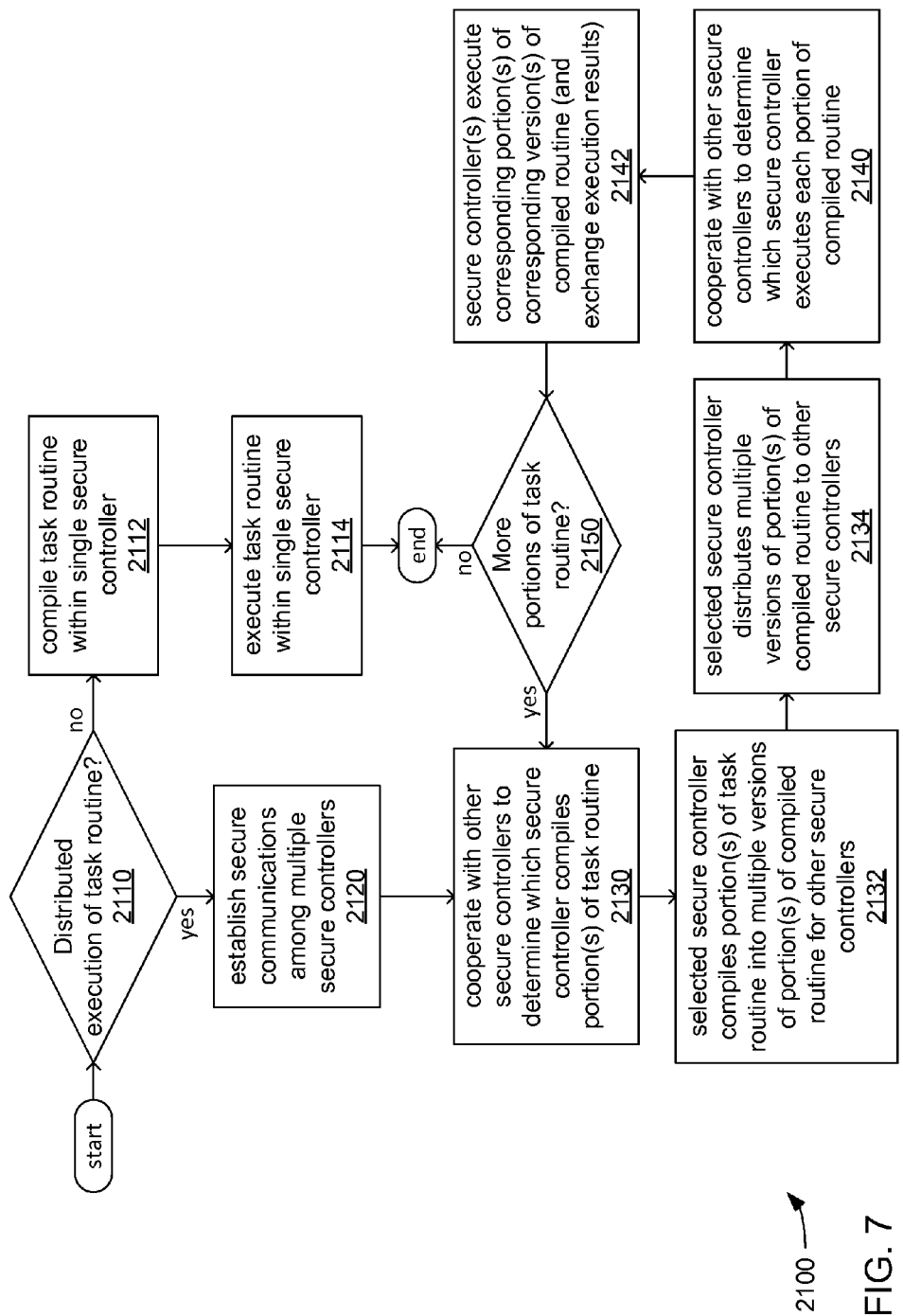
FIGS. 7-9 each illustrate a logic flow according to an embodiment.

FIG. 7 illustrates one embodiment of a logic flow 2100. The logic flow 2100 may be representative of some or all of the operations executed by one or more embodiments described herein. More specifically, the logic flow 2100 may illustrate operations performed by one or more of the processor components 250, 350 and/or 550 of corresponding ones of the secure controllers 300*a*, 300*b* and/or 600 in executing corresponding ones of the control routines 340 and/or 640, and/or performed by other component(s) of corresponding ones of the computing devices 200*a*, 200*b* and/or 500.

At 2110, a processor component of a secure controller incorporated into a computing device (e.g., the processor component 350 of the secure controller 300*a* of one of the computing devices 200*a*, the processor component 250 providing the virtual secure controller 300*b* within one of the computing devices 200*b*, or the processor component 550 providing one of the virtual secure controllers 600 within the server 500) may analyze one or more aspects of at least a portion of the instructions of a task routine (e.g., the task routine 110) to determine whether to compile and execute the task routine within that secure controller or to cooperate with other secure controllers to compile and/or execute the task routine in a distributed manner. As has been discussed, the processor component may analyze information included among the instructions of the task routine to determine what resources are required to compile and/or execute at least a portion of the task routine.

If the processor component determines at 2110 that the secure controller associated with the processor component has the required processing, storage and/or other resources needed to compile and execute the task routine, then the processor component may compile the task routine within that secure controller at 2112. Then, the processor component may execute the compiled version of the task routine at 2114.

However, if the processor component determines at 2110 that the secure controller associated with the processor component does not have the required processing, storage and/or other resources needed to compile and execute the task routine, then the processor component may prepare to cooperate with other secure controllers to compile and/or execute the task routine in a distributed manner by establishing secure communications with those other secure controllers at 2120. As has been discussed, it may be that these secure controllers were previously provided with security credentials at the time of manufacture and/or at a subsequent time during a "pairing" or other process by which two or more secure controllers may be prepared to recognize each other as trusted computing bases (TCBs).

At 2130, the processor component may cooperate with the processor components associated with the other secure controllers to determine which secure controller is to be selected to compile at least a portion of the task routine into multiple versions of at least a portion of a compiled routine. As previously discussed, various factors may be taken into account in determining which secure controller is so selected. Such factors may include the processing, storage and/or other resources currently available within each of the secure controllers. Alternatively or additionally, aspects of the network that couples the computing devices into which each secure controller is incorporated may be among such factors, including and not limited to, the type of communication technology by which each of those computing devices is coupled to the network, the quality of service experienced by each of those computing devices in communicating via the network, the current data transfer speed provided by the network to each of those computing devices and/or the geographic distance of each of those computing devices from the others. In support of enabling consideration of such factors, the processor components of each of the secure controllers currently present on the network may exchange at least a portion of the device data that each maintains at least about itself, including indications of what processing, storage and/or other resources are currently available within its secure controller, and/or indications of one or more of the above described aspects of the its connection to the network.

At 2132, the selected one of the secure controllers compiles at least a portion of the task routine to generate multiple versions of at least a portion of a compiled routine. As previously discussed, different versions of at least a portion of the compiled routine may be generated to accommodate differences in the processor components associated with each of the secure controllers. Again, different ones of those processor components may have entirely different instruction sets such that no single version of a compiled routine could be generated that would be executable by all of those different processor components. And again, alternatively or additionally, different ones of those processor components may instructions sets that are largely similar such that a single version of the compiled routine could be generated that would be executable by all of those different processor components, but with one or more of those processor components having unique instruction set features that may be deemed desirable enough to use that one or more different versions of the compiled routine may be generated to make use of those unique instruction set features. Following such compiling of at least a portion of the task routine, the selected one of the secure controllers may distribute the different versions of at least a portion of the compiled routine among the others of the secure controllers at 2134.

At 2140, the processor component may cooperate with the processor components associated with the other secure controllers to determine which secure controller is to execute each portion of the compiled routine that has been generated from the compiling of one or more corresponding portions of the task routine. As has been discussed, the task routine may perform a variety of functions, each of which may be associated with a portion of the instructions that make up the task routine. In executing the task routine in a distributed manner, different ones of the secure controllers may be selected to perform different ones of those functions. As a result, although each secure controller may be provided with a version of the compiled routine that includes multiple portions corresponding to multiple functions of the task routine, each of those secure controllers may be selected to execute only one of those multiple portions in its corresponding version of the compiled routine as part of being selected to perform only one of those multiple functions. Factors similar to those employed in selecting a secure controller to compile the task routine may be employed in determining which secure controller is to execute each portion of the compiled routine to perform one of the multiple functions.

At 2142, various ones of the secure controllers execute the portion(s) of the compiled routine assigned to them. As has been discussed as each of the secure controllers execute their respective one(s) of the portions of the compiled routine, one or more of those secure controllers may transmit an indication of the results of doing so to one or more of the others of those secure controllers. Again, it may be that such an exchange of indications of results is needed where execution of one of the portions requires an indication of the results of the execution of another of the portions as an input.

At 2150, a check is made as to whether there are more portions of the task routine that are still to be compiled. As has been explained, the compiling of some portions of the task routine may occur at least partly in parallel with the execution of other portions thereof. Again, this may arise as a result of implementing compiling as just-in-time (JIT) compiling (not unlike interpreting), speculative compiling, etc. Thus, there may be more portions of the task routine that are as yet to be compiled even as other portions of the task routine in compiled form are executed. If there are more portions of the task routine that have not yet been compiled, then the processor components of the multiple secure controllers may cooperate again at 2130 to determine which of those secure controllers is to be selected to compile the next portion(s) of the task routine. Again, as previously discussed, the selection of a secure controller to compile portions of the task routine may change as the resources available within each of the secure controllers change over time and/or as various secure controllers become present on the network and/or cease to be present on the network over time.

Figure 8:
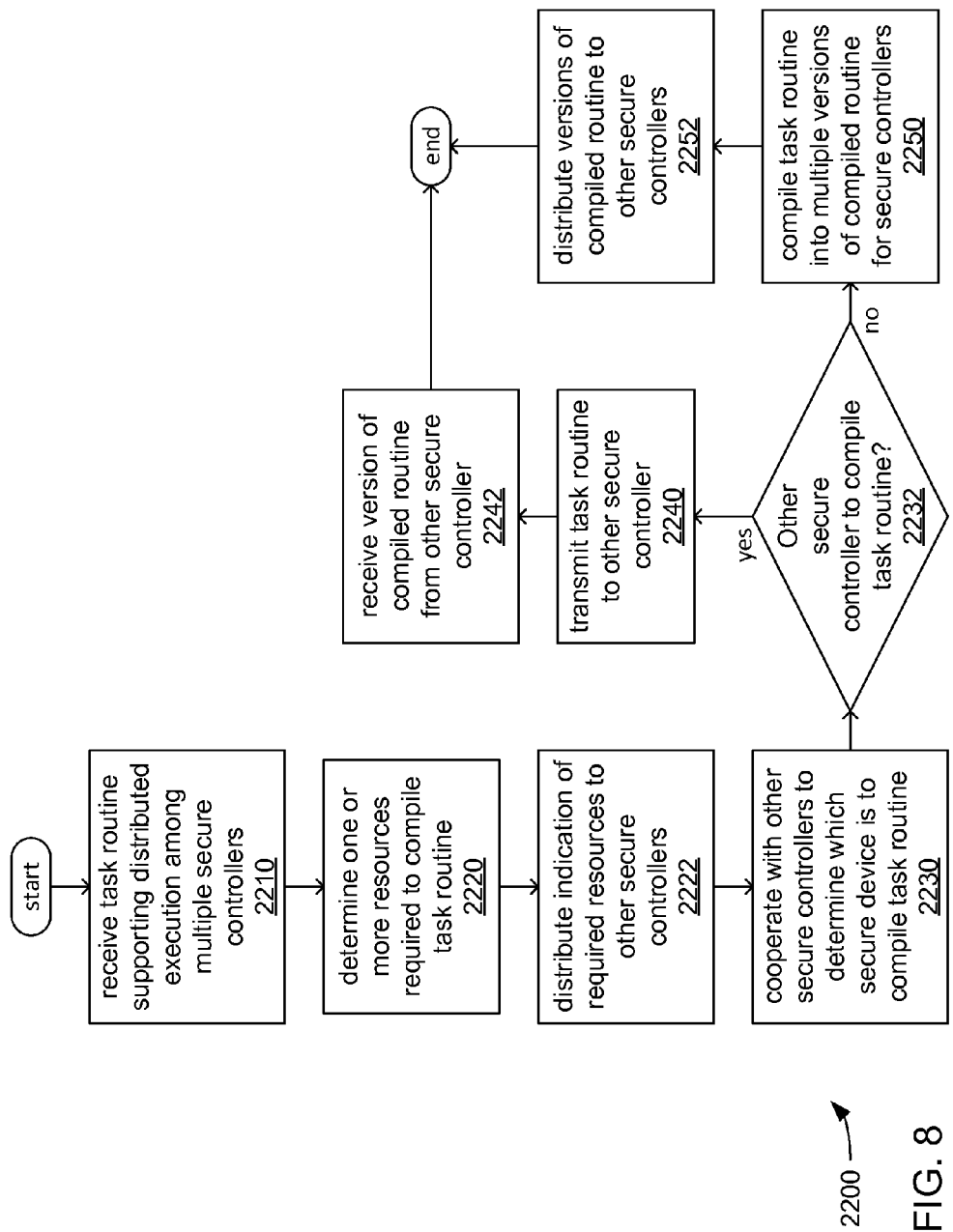

FIG. 8 illustrates one embodiment of a logic flow 2200. The logic flow 2200 may be representative of some or all of the operations executed by one or more embodiments described herein. More specifically, the logic flow 2200 may illustrate operations performed by one of the processor components 250, 350 and/or 550 of a corresponding one of the secure controllers 300a, 300b and/or 600 in executing a corresponding one of the control routines 340 and/or 640, and/or performed by other component(s) of a corresponding one of the computing devices 200a, 200b and/or 500.

At 2210, a processor component of a secure controller incorporated into a computing device (e.g., the processor component 350 of the secure controller 300a of one of the computing devices 200a, the processor component 250 providing the virtual secure controller 300b within one of the computing devices 200b, or the processor component 550 providing one of the virtual secure controllers 600 within the server 500) may operate an interface that couples the computing device to a network to receive a task routine via the network. As previously discussed, such received a task routine may have been created to be executed within a single secure controller and/or to be executed in a distributed manner among multiple secure controllers. For sake of discussion in reference to this logic flow, it will be assumed that the task routine was created in a manner making the task routine at least amenable to such distributed execution.

At 2220, the processor component may analyze information included among the instructions of the task routine to determine what resources are required to compile at least a portion of the task routine. Again, the task routine may include instructions or explicit indication of libraries of supporting routines required, what version(s) of compiler should be used and/or should not be used, etc. Alternatively or additionally, the processor component may analyze other aspects of the task routine, including and not limited to, the size of the task routine (e.g., the size in bits, bytes, kilobytes, megabytes, etc. of the task routine), what functions the task routine uses, what data types the task routine uses, the size of the largest data structure indicated in the task routine, etc. The processor component may then distribute an indication of what resources are required for the compilation of the task routine as determined by the processor component through its analysis at 2222.

At 2230, following such distribution of an indication of what resources are required to compile the task routine, the processor component may cooperate with the processor components associated with the other secure controllers to determine which secure controller is to be selected to compile at least a portion of the task routine into multiple versions of at least a portion of a compiled routine. As previously discussed, various factors may be taken into account in determining which secure controller is so selected, including and not limited to, what resources are currently available within each of the secure controllers and/or qualitative aspects of the manner in which each secure controller is currently coupled to the network. Again, the processor components of each of the secure controllers currently present on the network may operate corresponding interfaces to exchange through the network at least a portion of the device data that each maintains at least about the secure controller into which each is incorporated, including indications of what processing, storage and/or other resources are currently available within its secure controller, and/or indications of one or more of the above described aspects of the its connection to the network.

If, at 2232, another of the secure controllers is selected to compile the task routine, then processor component may operate the interface to transmit the task routine to that other secure controller via the network. The processor component may then subsequently operate the interface to receive a version of the compiled routine generated by the compiling of the task routine within that other secure controller at 2242.

However, if, at 2232, none of the other another of the secure controller are selected to compile the task routine, then processor component may compile the task routine to generate multiple versions of a compiled routine at 2250. Again, such multiple versions may be generated to accommodate different types of processor components in others of the secure controllers that have different instruction sets, and/or to accommodate different types of processor components in others of the secure controllers that have the same instruction set with one or more different unique features that are deemed desirable to use. The processor component may then subsequently operate the interface to distribute the different versions of the compiled routine to the other secure controllers at 2252.

Figure 9:
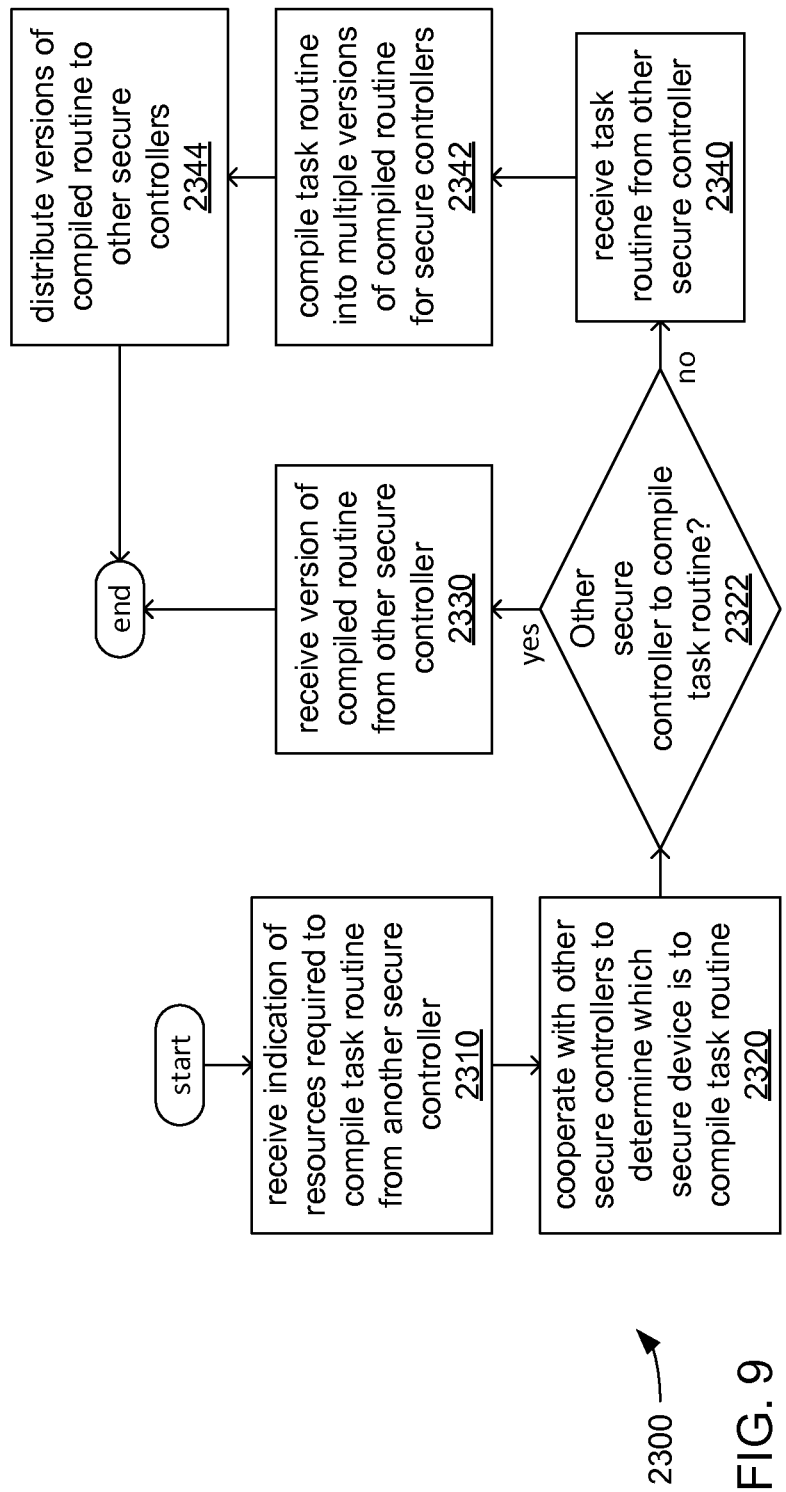

FIG. 9 illustrates one embodiment of a logic flow 2300. The logic flow 2300 may be representative of some or all of the operations executed by one or more embodiments described herein. More specifically, the logic flow 2300 may illustrate operations performed by one of the processor components 250, 350 and/or 550 of a corresponding one of the secure controllers 300a, 300b and/or 600 in executing a corresponding one of the control routines 340 and/or 640, and/or performed by other component(s) of a corresponding one of the computing devices 200a, 200b and/or 500.

At 2310, a processor component of a secure controller incorporated into a computing device (e.g., the processor component 350 of the secure controller 300a of one of the computing devices 200a, the processor component 250 providing the virtual secure controller 300b within one of the computing devices 200b, or the processor component 550 providing one of the virtual secure controllers 600 within the server 500) may operate an interface that couples the computing device to a network to receive an indication of resources required to compile a task routine via the network. Again, such an indication may be generated and transmitted by the processor component of another secure controller having analyzed various aspects of the task routine to determine what those required resources are.

At 2320, following such distribution of an indication of what resources are required to compile the task routine, the processor component may cooperate with the processor components associated with the other secure controllers to determine which secure controller is to be selected to compile at least a portion of the task routine into multiple versions of at least a portion of a compiled routine. Again, the processor components of each of the secure controllers currently present on the network may operate corresponding interfaces to exchange through the network at least a portion of the device data that each maintains at least about the secure controller into which each is incorporated, including indications of what processing, storage and/or other resources are currently available within its secure controller, and/or indications of one or more of the above described aspects of the its connection to the network.

If, at 2322, another of the secure controllers is selected to compile the task routine, then processor component may operate the interface to receive a version of the compiled routine generated by the compiling of the task routine within that other secure controller at 2330. However, if, at 2322, none of the other another of the secure controller are selected to compile the task routine, then processor component may operate the interface to receive the task routine from another of the secure controllers via the network at 2340. Then, at 2342, the processor component may compile the task routine to generate multiple versions of a compiled routine. The processor component may then subsequently operate the interface to distribute the different versions of the compiled routine to the other secure controllers at 2344.

Figure 10:
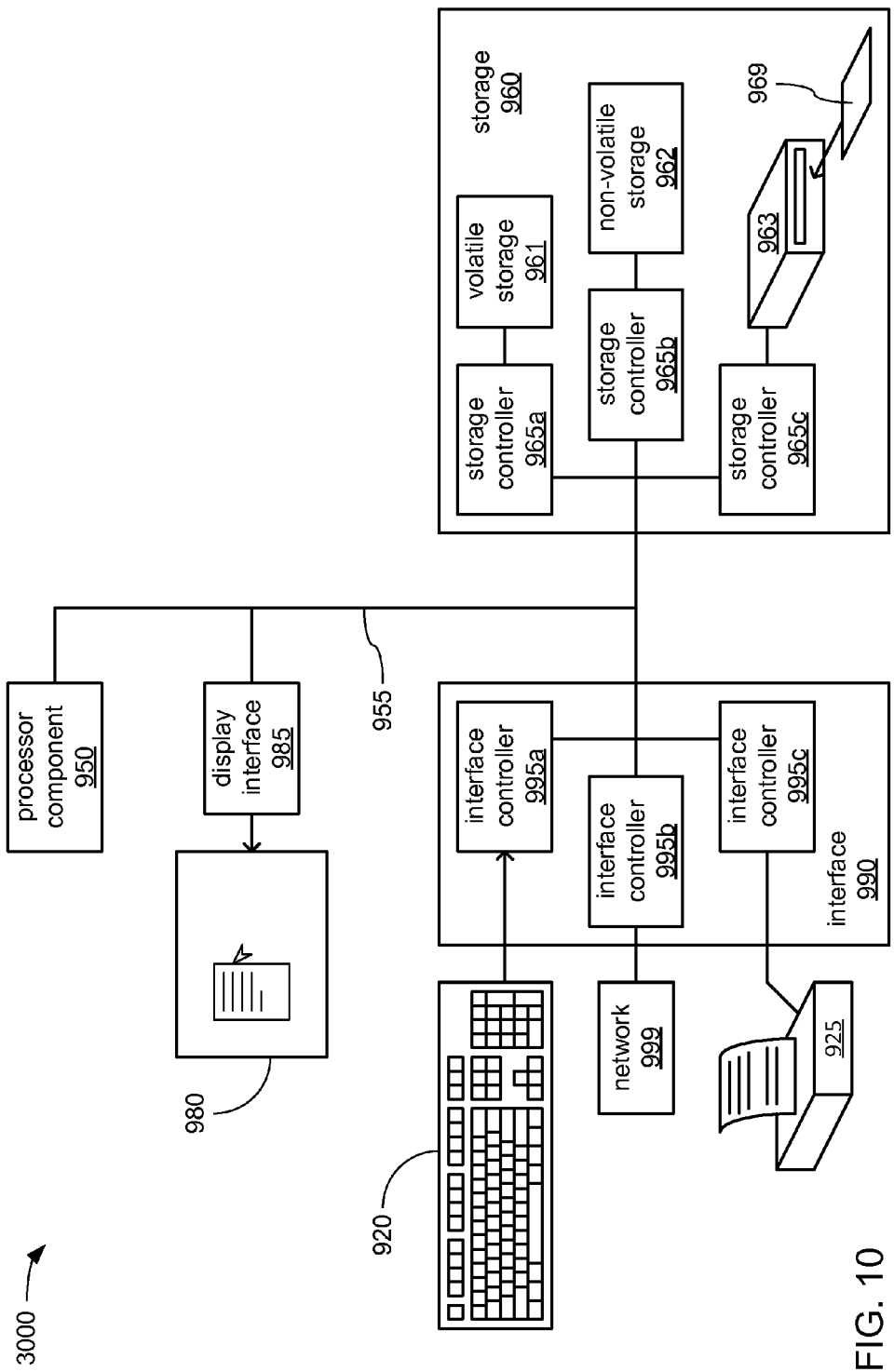
FIG. 10 illustrates a processing architecture according to an embodiment.

FIG. 10 illustrates an embodiment of an exemplary processing architecture 3000 suitable for implementing various embodiments as previously described. More specifically, the processing architecture 3000 (or variants thereof) may be implemented as part of one or more of the computing devices 100, 300, or 600, and/or the controller 400. It should be noted that components of the processing architecture 3000 are given reference numbers in which the last two digits correspond to the last two digits of reference numbers of at least some of the components earlier depicted and described as part of the computing devices 100, 300 and 600, as well as the controller 400. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 includes one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350, 450 and 650) may include any of a wide variety of commercially available processors, employing any of a wide variety of technologies and implemented with one or more cores physically combined in any of a number of ways.

As previously discussed, the storage 960 (corresponding to the storages 360, 460 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 such that it may include multiple distinct types of storage is in recognition of the commonplace use of more than one type of storage device in computing devices in which one type provides relatively rapid reading and writing capabilities enabling more rapid manipulation of data by the processor component 950 (but which may use a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to the interfaces 190, 390 or 690) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus includes a first processor component and a first secure controller of a first computing device. The first secure controller includes a selection component to select one of the first secure controller and a second secure controller of a second computing device to compile a task routine based at least on a comparison of a required resource to compile the task routine and an available resource of the first secure controller; and a compiling component to compile the task routine into a first version of a compiled routine for execution within the first secure controller by the first processor component and a second version of the compiled routine for execution within the second secure controller by a second processor component in response to a selection of the first secure controller to compile the task routine.

In Example 2, which includes the subject matter of Example 1, the compiling component may analyze the task routine to determine the required resource, and the selection component may transmit an indication of the required resource to the second secure controller and may cooperate with the second controller to select one of the first secure controller and the second secure controller to compile the task routine.

In Example 3, which includes the subject matter of any of Examples 1-2, the selection component may transmit an indication of the available resource to the second secure controller to enable the cooperation.

In Example 4, which includes the subject matter of any of Examples 1-3, the compiling component may include a first compiler to compile the task routine to generate the first version of the compiled routine, and a second compiler selected by the compiling component to separately compile the task routine to generate the second version of the compiled routine based on an indication received from the second secure controller of an aspect of the second processor component.

In Example 5, which includes the subject matter of any of Examples 1-4, the compiling component may include a compiler to compile the task routine to generate the first version of the compiled routine, and a thunking component to translate the first version of the compiled routine to generate the second version of the compiled routine to enable use of at least one of a feature unique to the first processor component or a feature unique to the second processor component through the generation of the first and second versions based on an indication received from the second secure controller of an aspect of the second processor component.

In Example 6, which includes the subject matter of any of Examples 1-5, the selection component may repeatedly exchange at least a portion of a device data with the second secure controller, where the portion of device data may include an indication of at least one of an aspect of the first processor component, an aspect of the second processor component, the available resource of the first secure controller, an available resource of the second secure controller, an aspect of a connection of the first computing device to a network extending between the first and second computing devices, or an aspect of a connection of the second computing device to the network.

In Example 7, the selection component may select one of the first secure controller and the second secure controller to compile the task routine based on the indication.

In Example 8, which includes the subject matter of any of Examples 1-7, the apparatus may include an execution component to execute at least a portion of the first version of the compiled routine, the selection component to cooperate with the second secure controller to determine whether the first processor component is to execute at least a first portion of the first version of the compiled routine corresponding to a first function of the task routine, and to determine whether the second processor component is to execute at least a second portion of the second version of the compiled routine corresponding to a second function of the task routine.

In Example 9, which includes the subject matter of any of Examples 1-8, the execution component may execute at least the first portion of the first version of the compiled routine at least partly in parallel with the compiling component compiling the task routine to generate at least a third portion of the first version of the compiled routine corresponding to a third function of the task routine, and to exchange an indication of a result of execution of at least one of the first portion of the first version of the compiled routine or the second portion of the second version of the compiled routine with the second secure controller.

In Example 10, which includes the subject matter of any of Examples 1-9, the apparatus may include a security component to exchange a security credential with the second secure controller to enable at least one of recognition of the first secure controller by the second secure controller as a member of a secure processing system, recognition of the second secure controller by the first secure controller as a member of the secure processing system, or encryption of at least one of the task routine or the first or second versions of the compiled routine when exchanged between the first and second secure controllers.

In Example 11, which includes the subject matter of any of Examples 1-10, the apparatus may include an interface to couple the first computing device to the second computing device via a network, and the first secure controller may include a communications component to couple the first secure controller to the second secure controller through the interface and the network.

In Example 12, which includes the subject matter of any of Examples 1-11, the apparatus may include another processor component external to the first secure controller, where the other processor component may execute at least one of an operating system or an application routine, the first secure controller may include the first processor component, and the first processor component may execute the selection component and the compiling component within the first secure controller in isolation from the other processor component.

In Example 13, which includes the subject matter of any of Examples 1-12, the first secure controller may include a virtual secure controller provided by the first processor component, and the first processor component may execute the selection component and the compiling component within the first controller in isolation from execution of at least one of an operating system and an application routine by the first processor component.

In Example 14, which includes the subject matter of any of Examples 1-13, the first processor component may generate a virtual machine (VM) within the first computing device and to provide the first secure controller within the VM.

In Example 15, a computing-implemented method includes selecting one of a first secure controller of a first computing device and a second secure controller of a second computing device to compile a task routine based at least on a comparison of a required resource to compile the task routine and an available resource of the first secure controller; and compiling, using a first processor component of the first secure controller, the task routine into a first version of a compiled routine for execution within the first secure controller by the first processor component and a second version of the compiled routine for execution within the second secure controller by a second processor component in response to a selection of the first secure controller to compile the task routine.

In Example 16, which includes the subject matter of Example 15, the method may include analyzing the task routine to determine the required resource, transmitting an indication of the required resource to the second secure controller, and cooperating with the second controller to select one of the first secure controller and the second secure controller to compile the task routine.

In Example 17, which includes the subject matter of any of Examples 15-16, the method may include transmitting an indication of the available resource to the second secure controller to enable the cooperation.

In Example 18, which includes the subject matter of any of Examples 15-17, the method may include compiling the task routine to generate the first version of the compiled routine, and separately compiling the task routine to generate the second version of the compiled routine based on an indication received from the second secure controller of an aspect of the second processor component.

In Example 19, which includes the subject matter of any of Examples 15-18, the method may include compiling the task routine to generate the first version of the compiled routine, and translating the first version of the compiled routine to generate the second version of the compiled routine to enable use of at least one of a feature unique to the first processor component or a feature unique to the second processor component through the generation of the first and second versions based on an indication received from the second secure controller of an aspect of the second processor component.

In Example 20, which includes the subject matter of any of Examples 15-19, the method may include repeatedly exchanging at least a portion of a device data with the second secure controller, where the portion of device data may include an indication of at least one of an aspect of the first processor component, an aspect of the second processor component, the available resource of the first secure controller, an available resource of the second secure controller, an aspect of a connection of the first computing device to a network extending between the first and second computing devices, or an aspect of a connection of the second computing device to the network.

In Example 21, which includes the subject matter of any of Examples 15-20, the method may include selecting one of the first secure controller and the second secure controller to compile the task routine based on the indication.

In Example 22, which includes the subject matter of any of Examples 15-21, the method may include cooperating with the second secure controller to determine whether the first processor component is to execute at least a first portion of the first version of the compiled routine corresponding to a first function of the task routine, and to determine whether the second processor component is to execute at least a second portion of the second version of the compiled routine corresponding to a second function of the task routine.

In Example 23, which includes the subject matter of any of Examples 15-22, the method may include executing at least the first portion of the first version of the compiled routine at least partly in parallel with compiling the task routine to generate at least a third portion of the first version of the compiled routine corresponding to a third function of the task routine, and exchanging an indication of a result of execution of at least one of the first portion of the first version of the compiled routine or the second portion of the second version of the compiled routine with the second secure controller.

In Example 24, which includes the subject matter of any of Examples 15-23, the method may include exchanging a security credential with the second secure controller to enable at least one of recognition of the first secure controller by the second secure controller as a member of a secure processing system, recognition of the second secure controller by the first secure controller as a member of the secure processing system, or encryption of at least one of the task routine or the first or second versions of the compiled routine when exchanged between the first and second secure controllers.

In Example 25, which includes the subject matter of any of Examples 15-24, the method may include exchanging the security credential with the second secure controller through a network extending between the first and second computing devices.

In Example 26, at least one tangible machine-readable storage medium includes instructions that when executed by a first processor component, may cause the first processor component to select one of a first secure controller of a first computing device and a second secure controller of a second computing device to compile a task routine based at least on a comparison of a required resource to compile the task routine and an available resource of the first secure controller, and compile, using a first processor component, the task routine into a first version of a compiled routine for execution within the first secure controller by the first processor component and a second version of the compiled routine for execution within the second secure controller by a second processor component in response to a selection of the first secure controller to compile the task routine.

In Example 27, which includes the subject matter of Example 26, the first processor component may be caused to analyze the task routine to determine the required resource, transmit an indication of the required resource to the second secure controller, and cooperate with the second controller to select one of the first secure controller and the second secure controller to compile the task routine.

In Example 28, which includes the subject matter of any of Examples 26-27, the first processor component may be caused to transmit an indication of the available resource to the second secure controller to enable the cooperation.

In Example 29, which includes the subject matter of any of Examples 26-28, the first processor component may be caused to compile the task routine to generate the first version of the compiled routine, and separately compile the task routine to generate the second version of the compiled routine based on an indication received from the second secure controller of an aspect of the second processor component.

In Example 30, which includes the subject matter of any of Examples 26-29, the first processor component may be caused to compile the task routine to generate the first version of the compiled routine, and translate the first version of the compiled routine to generate the second version of the compiled routine to enable use of at least one of a feature unique to the first processor component or a feature unique to the second processor component through the generation of the first and second versions based on an indication received from the second secure controller of an aspect of the second processor component.

In Example 31, which includes the subject matter of any of Examples 26-30, the first processor component may be caused to repeatedly exchange at least a portion of a device data with the second secure controller, where the portion of device data may include an indication of at least one of an aspect of the first processor component, an aspect of the second processor component, the available resource of the first secure controller, an available resource of the second secure controller, an aspect of a connection of the first computing device to a network extending between the first and second computing devices, or an aspect of a connection of the second computing device to the network.

In Example 32, which includes the subject matter of any of Examples 26-31, the first processor component may be caused to select one of the first secure controller and the second secure controller to compile the task routine based on the indication.

In Example 33, which includes the subject matter of any of Examples 26-32, the first processor component may be caused to cooperate with the second secure controller to determine whether the first processor component is to execute at least a first portion of the first version of the compiled routine corresponding to a first function of the task routine, and to determine whether the second processor component is to execute at least a second portion of the second version of the compiled routine corresponding to a second function of the task routine.

In Example 34, which includes the subject matter of any of Examples 26-33, the first processor component may be caused to execute at least the first portion of the first version of the compiled routine at least partly in parallel with compiling the task routine to generate at least a third portion of the first version of the compiled routine corresponding to a third function of the task routine, and to exchange an indication of a result of execution of at least one of the first portion of the first version of the compiled routine or the second portion of the second version of the compiled routine with the second secure controller.

In Example 35, which includes the subject matter of any of Examples 26-34, the first processor component may be caused to exchange a security credential with the second secure controller to enable at least one of recognition of the first secure controller by the second secure controller as a member of a secure processing system, recognition of the second secure controller by the first secure controller as a member of the secure processing system, or encryption of at least one of the task routine or the first or second versions of the compiled routine when exchanged between the first and second secure controllers.

In Example 36, which includes the subject matter of any of Examples 26-35, the first processor component may be caused to exchange the security credential with the second secure controller through a network extending between the first and second computing devices.

In Example 37, an apparatus includes a first processor component, and a first secure controller of a first computing device. The first secure controller includes a selection component to select one of the first secure controller and a second secure controller of a second computing device to compile a task routine based at least on a comparison of an available resource of the first secure controller and a required resource to compile the task routine into a first version of a compiled routine for execution within the first secure controller by the first processor component and a second version of the compiled routine for execution within a second secure controller by a second processor component, and to transmit the task routine to the second secure controller in response to a selection of the second secure controller to compile the task routine; and an execution component to execute at least a portion of the first version of the compiled routine.

In Example 38, which includes the subject matter of Example 37, the apparatus may include a compiling component to analyze the task routine to determine the required resource, and the selection component may transmit an indication of the required resource to the second secure controller and to cooperate with the second controller to select one of the first secure controller and the second secure controller to compile the task routine.

In Example 39, which includes the subject matter of any of Examples 37-38, the selection component may transmit an indication of the available resource to the second secure controller to enable the cooperation.

In Example 40, which includes the subject matter of any of Examples 37-39, the selection component may repeatedly exchange at least a portion of a device data with the second secure controller, where the portion of device data may include an indication of at least one of an aspect of the first processor component, an aspect of the second processor component, the available resource of the first secure controller, an available resource of the second secure controller, an aspect of a connection of the first computing device to a network extending between the first and second computing devices, or an aspect of a connection of the second computing device to the network.

In Example 41, which includes the subject matter of any of Examples 37-40, the selection component may select one of the first secure controller and the second secure controller to compile the task routine based on the indication.

In Example 42, which includes the subject matter of any of Examples 37-41, the selection component may cooperate with the second secure controller to determine whether the first processor component is to execute at least a first portion of the first version of the compiled routine corresponding to a first function of the task routine, and to determine whether the second processor component is to execute at least a second portion of the second version of the compiled routine corresponding to a second function of the task routine.

In Example 43, which includes the subject matter of any of Examples 37-42, the execution component may execute at least the first portion of the first version of the compiled routine at least partly in parallel with the second secure controller compiling the task routine to generate at least a third portion of the first version of the compiled routine corresponding to a third function of the task routine, and to exchange an indication of a result of execution of at least one of the first portion of the first version of the compiled routine or the second portion of the second version of the compiled routine with the second secure controller.

In Example 44, which includes the subject matter of any of Examples 37-43, the apparatus may include a security component to exchange a security credential with the second secure controller to enable at least one of recognition of the first secure controller by the second secure controller as a member of a secure processing system, recognition of the second secure controller by the first secure controller as a member of the secure processing system, or encryption of at least one of the task routine or the first or second versions of the compiled routine when exchanged between the first and second secure controllers.

In Example 45, which includes the subject matter of any of Examples 37-44, the apparatus may include an interface to couple the first computing device to the second computing device via a network, and the first secure controller may include a communications component to couple the first secure controller to the second secure controller through the interface and the network.

In Example 46, which includes the subject matter of any of Examples 37-45, the apparatus may include another processor component external to the first secure controller, the other processor component may execute at least one of an operating system or an application routine, the first secure controller may include the first processor component, and the first processor component may execute the selection component and the execution component within the first secure controller in isolation from the other processor component.

In Example 47, which includes the subject matter of any of Examples 37-46, the first secure controller may include a virtual secure controller provided by the first processor component, and the first processor component to execute the selection component and the execution component within the first controller in isolation from execution of at least one of an operating system and an application routine by the first processor component.

In Example 48, which includes the subject matter of any of Examples 37-47, the first processor component may generate a virtual machine (VM) within the first computing device and to provide the first secure controller within the VM.

In Example 49, a computing-implemented method includes selecting one of a first secure controller of a first computing device and a second secure controller of a second computing device to compile a task routine based at least on a comparison of an available resource of the first secure controller and a required resource to compile the task routine into a first version of a compiled routine for execution within the first secure controller by a first processor component and a second version of the compiled routine for execution within a second secure controller by a second processor component; transmitting the task routine to the second secure controller in response to a selection of the second secure controller to compile the task routine; and executing, by the first processor component within the first secure controller, at least a portion of the first version of the compiled routine.

In Example 50, which includes the subject matter of Example 49, the method may include analyzing the task routine to determine the required resource; transmitting an indication of the required resource to the second secure controller; and cooperating with the second controller to select one of the first secure controller and the second secure controller to compile the task routine.

In Example 51, which includes the subject matter of any of Examples 49-50, the method may include transmitting an indication of the available resource to the second secure controller to enable the cooperation.

In Example 52, which includes the subject matter of any of Examples 49-51, the method may include repeatedly exchanging at least a portion of a device data with the second secure controller, where the portion of device data may include an indication of at least one of an aspect of the first processor component, an aspect of the second processor component, the available resource of the first secure controller, an available resource of the second secure controller, an aspect of a connection of the first computing device to a network extending between the first and second computing devices, or an aspect of a connection of the second computing device to the network.

In Example 53, which includes the subject matter of any of Examples 49-52, the method may include selecting one of the first secure controller and the second secure controller to compile the task routine based on the indication.

In Example 54, which includes the subject matter of any of Examples 49-53, the method may include cooperating with the second secure controller to determine whether the first processor component is to execute at least a first portion of the first version of the compiled routine corresponding to a first function of the task routine, and to determine whether the second processor component is to execute at least a second portion of the second version of the compiled routine corresponding to a second function of the task routine.

In Example 55, which includes the subject matter of any of Examples 49-54, the method may include executing at least the first portion of the first version of the compiled routine at least partly in parallel with the second secure controller compiling the task routine to generate at least a third portion of the first version of the compiled routine corresponding to a third function of the task routine, and exchanging an indication of a result of execution of at least one of the first portion of the first version of the compiled routine or the second portion of the second version of the compiled routine with the second secure controller.

In Example 56, which includes the subject matter of any of Examples 49-55, the method may include exchanging a security credential with the second secure controller to enable at least one of recognition of the first secure controller by the second secure controller as a member of a secure processing system, recognition of the second secure controller by the first secure controller as a member of the secure processing system, or encryption of at least one of the task routine or the first or second versions of the compiled routine when exchanged between the first and second secure controllers.

In Example 57, which includes the subject matter of any of Examples 49-56, the method may include exchanging the security credential with the second secure controller through a network extending between the first and second computing devices.

In Example 58, at least one tangible machine-readable storage medium may include instructions that when executed by a processor component, cause the processor component to perform any of the above.

In Example 59, an apparatus may include means for performing any of the above.

The invention claimed is:

1. A computer-implemented method comprising:
exchanging a security credential between a first secure controller of a first computing device and a second secure controller of a second computing device to enable recognition of the second secure controller by the first secure controller as a member of a secure processing system;
selecting one of the first secure controller of the first computing device in the secure processing system and the second secure controller of the second computing device in the secure processing system to compile a task routine based at least on a determination the second secure controller is present in the secure processing system and a comparison of a required resource to compile the task routine and an available resource of the first secure controller;
compiling, using a first processor component of the first secure controller, the task routine into a first version of a compiled routine for execution within the first secure controller by the first processor component and a second version of the compiled routine for execution within the second secure controller by a second processor component in response to a selection of the first secure controller to compile the task routine; and
selecting a portion of the first version of the compiled routine to execute on the first secure controller and a portion of the second version of the compiled routine to execute on the second secure controller;
receiving an indication of a result of execution of the portion of the second version of the compiled routine; and
utilizing the indication of the result of execution of the portion of the second version of the compiled routine to execute the portion of the first version of the compiled routine.

2. The computer-implemented method of claim 1, the method comprising:
analyzing the task routine to determine the required resource;
transmitting an indication of the required resource to the second secure controller; and
cooperating with the second controller to select one of the first secure controller and the second secure controller to compile the task routine.

3. The computer-implemented method of claim 2, the method comprising transmitting an indication of the available resource to the second secure controller to enable the cooperation.

4. The computer-implemented method of claim 1, the method comprising:
compiling the task routine to generate the first version of the compiled routine; and
separately compiling the task routine to generate the second version of the compiled routine based on an indication received from the second secure controller of an aspect of the second processor component.

5. The computer-implemented method of claim 1, the method comprising:
compiling the task routine to generate the first version of the compiled routine; and
translating the first version of the compiled routine to generate the second version of the compiled routine to enable use of at least one of a feature unique to the first processor component or a feature unique to the second processor component through generation of the first and second versions based on an indication received from the second secure controller of an aspect of the second processor component.

6. An apparatus comprising:
a first processor component comprised in hardware; and
a first secure controller of a first computing device in a secure processing system, the first secure controller comprising:
a security component to exchange a security credential with a second secure controller of a second computing device to enable recognition of the second secure controller by the first secure controller as a member of the secure processing system;
a selection component to select one of the first secure controller and the second secure controller of the second computing device in the secure processing system to compile a task routine based at least on a comparison of a required resource to compile the task routine and an available resource of the first secure controller;
a compiling component to compile the task routine into a first version of a compiled routine for execution within the first secure controller by the first processor component and a second version of the compiled routine for execution within the second secure controller by a second processor component in response to a selection of the first secure controller to compile the task routine;
the selection component to cooperate in selection of a portion of the first version of the compiled routine to execute on the first secure controller and a portion of the second version of the compiled routine to execute on the second secure controller;
a communications component to receive an indication of a result of execution of the portion of the second version of the compiled routine; and an execution component to utilize the indication of the result of execution of the portion of the second version of the compiled routine to execute the portion of the first version of the compiled routine.

7. The apparatus of claim 6, the compiling component comprising:
a first compiler to compile the task routine to generate the first version of the compiled routine; and
a second compiler selected by the compiling component to separately compile the task routine to generate the second version of the compiled routine based on an indication received from the second secure controller of an aspect of the second processor component.

8. The apparatus of claim 6, the compiling component comprising:
a compiler to compile the task routine to generate the first version of the compiled routine; and
a thunking component to translate the first version of the compiled routine to generate the second version of the compiled routine to enable use of at least one of a feature unique to the first processor component or a feature unique to the second processor component through generation of the first and second versions based on an indication received from the second secure controller of an aspect of the second processor component.

9. The apparatus of claim 6, the selection component to repeatedly exchange at least a portion of a device data with the second secure controller, the portion of the device data comprising an indication of at least one of an aspect of the first processor component, an aspect of the second processor component, the available resource of the first secure controller, an available resource of the second secure controller, an aspect of a connection of the first computing device to a network extending between the first and second computing devices, or an aspect of a connection of the second computing device to the network.

10. The apparatus of claim 9, the selection component to cooperate with the second secure controller to determine the first processor component is to execute at least a first portion of the first version of the compiled routine corresponding to a first function of the task routine, and to determine the second processor component is to execute at least a second portion of the second version of the compiled routine corresponding to a second function of the task routine.

11. The apparatus of claim 10, the execution component to execute at least the first portion of the first version of the compiled routine at least partly in parallel with the compiling component compiling the task routine to generate at least a third portion of the first version of the compiled routine corresponding to a third function of the task routine, and to exchange an indication of a result of execution of at least one of the first portion of the first version of the compiled routine or the second portion of the second version of the compiled routine with the second secure controller.

12. The apparatus of claim 6, comprising another processor component external to the first secure controller, the other processor component to execute at least one of an operating system or an application routine, the first secure controller comprising the first processor component, and the first processor component to execute the selection component and the compiling component within the first secure controller in isolation from the other processor component.

13. The apparatus of claim 6, the first secure controller comprising a virtual secure controller provided by the first processor component, and the first processor component to execute the selection component and the compiling component within the first controller in isolation from execution of at least one of an operating system and an application routine by the first processor component.

14. At least one non-transitory machine-readable storage medium comprising instructions that when executed by a first processor component, cause the first processor component to:
exchange a security credential between a first secure controller of a first computing device and a second secure controller of a second computing device to enable recognition of the second secure controller by the first secure controller as a member of a secure processing system;
select one of the first secure controller of the first computing device in the secure processing system and the second secure controller of the second computing device in the secure processing system to compile a task routine based at least on a comparison of a required resource to compile the task routine and an available resource of the first secure controller;
compile, using a first processor component, the task routine into a first version of a compiled routine for execution within the first secure controller by the first processor component and a second version of the compiled routine for execution within the second secure controller by a second processor component in response to a selection of the first secure controller to compile the task routine; and
cooperate in selection of a portion of the first version of the compiled routine to execute on the first secure controller and a portion of the second version of the compiled routine to execute on the second secure controller;
receiving an indication of a result of execution of the portion of the second version of the compiled routine; and
utilizing the indication of the result of execution of the portion of the second version of the compiled routine to execute the portion of the first version of the compiled routine.

15. The at least one non-transitory machine-readable storage medium of claim 14, the first processor component caused to:
compile the task routine to generate the first version of the compiled routine; and
separately compile the task routine to generate the second version of the compiled routine based on an indication received from the second secure controller of an aspect of the second processor component.

16. The at least one non-transitory machine-readable storage medium of claim 14, the first processor component caused to:
compile the task routine to generate the first version of the compiled routine; and
translate the first version of the compiled routine to generate the second version of the compiled routine to enable use of at least one of a feature unique to the first processor component or a feature unique to the second processor component through generation of the first and second versions based on an indication received from the second secure controller of an aspect of the second processor component.

17. The at least one non-transitory machine-readable storage medium of claim 14, the first processor component caused to repeatedly exchange at least a portion of a device data with the second secure controller, the portion of the device data comprising an indication of at least one of an aspect of the first processor component, an aspect of the second processor component, the available resource of the first secure controller, an available resource of the second secure controller, an aspect of a connection of the first computing device to a network extending between the first and second computing devices, or an aspect of a connection of the second computing device to the network.

18. The at least one non-transitory machine-readable storage medium of claim 17, the first processor component caused to select one of the first secure controller and the second secure controller to compile the task routine based on the indication.

19. A computer-implemented method comprising:
exchanging a security credential between a first secure controller of a first computing device and a second secure controller of a second computing device to enable recognition of the second secure controller by the first secure controller as a member of a secure processing system;
selecting one of the first secure controller of the first computing device in the secure processing system and the second secure controller of the second computing device in the secure processing system to compile a task routine based at least on a comparison of an available resource of the first secure controller and a required resource to compile the task routine into a first version of a compiled routine for execution within the first secure controller by a first processor component and a second version of the compiled routine for execution within a second secure controller by a second processor component;
transmitting the task routine to the second secure controller in response to a selection of the second secure controller to compile the task routine;
selecting a portion of the first version of the compiled routine for execution on the first secure controller and a portion of the second version of the compiled routine for execution on the second secure controller;
receiving an indication of a result of execution of the portion of the second version of the compiled routine; and
executing, by the first processor component within the first secure controller, the portion of the first version of the compiled routine based on the indication of the result of execution of the portion of the second version of the compiled routine.

20. The computer-implemented method of claim 19, the method comprising:
analyzing the task routine to determine the required resource;
transmitting an indication of the required resource to the second secure controller; and
cooperating with the second controller to select one of the first secure controller and the second secure controller to compile the task routine.

21. The computer-implemented method of claim 20, the method comprising transmitting an indication of the available resource to the second secure controller to enable the cooperation.

22. The computer-implemented method of claim 19, the method comprising cooperating with the second secure controller to determine the first processor component is to execute at least a first portion of the first version of the compiled routine corresponding to a first function of the task routine, and to determine the second processor component is to execute at least a second portion of the second version of the compiled routine corresponding to a second function of the task routine.

23. The computer-implemented method of claim 22, the method comprising:
executing at least the first portion of the first version of the compiled routine at least partly in parallel with the second secure controller compiling the task routine to generate at least a third portion of the first version of the compiled routine corresponding to a third function of the task routine; and
exchanging an indication of a result of execution of at least one of the first portion of the first version of the compiled routine or the second portion of the second version of the compiled routine with the second secure controller.

24. The computer-implemented method of claim 19, the method comprising exchanging a security credential with the second secure controller to enable at least one of recognition of the first secure controller by the second secure controller as a member of the secure processing system or encryption of at least one of the task routine or the first or second versions of the compiled routine when exchanged between the first and second secure controllers.

25. The computer-implemented method of claim 24, the method comprising exchanging the security credential with the second secure controller through a network extending between the first and second computing devices.

* * * * *